(12) United States Patent
Wagner et al.

(10) Patent No.: US 7,897,716 B2
(45) Date of Patent: Mar. 1, 2011

(54) POLYORGANOSILOXANE COMPOSITIONS FOR THE TREATMENT OF SUBSTRATES

(75) Inventors: Roland Wagner, St. Augustin (DE); Christopher Roos, Köln (DE); Martin Kropfgans, Odenthal (DE); Albert Schnering, Köln (DE)

(73) Assignee: Momentive Performance Materials GmbH, Leverkusen (DE)

( * ) Notice: Subject to any disclaimer, the term of this patent is extended or adjusted under 35 U.S.C. 154(b) by 1261 days.

(21) Appl. No.: 10/556,124

(22) PCT Filed: May 13, 2004

(86) PCT No.: PCT/EP2004/050797

§ 371 (c)(1),
(2), (4) Date: Jun. 22, 2006

(87) PCT Pub. No.: WO2004/101684

PCT Pub. Date: Nov. 25, 2004

(65) Prior Publication Data

US 2006/0237155 A1    Oct. 26, 2006

(30) Foreign Application Priority Data

May 14, 2003 (DE) ............................. 103 21 558

(51) Int. Cl.
*C08G 77/26* (2006.01)

(52) U.S. Cl. ........................................ 528/28; 524/474
(58) Field of Classification Search .................. 528/28; 525/474
See application file for complete search history.

(56) References Cited

U.S. PATENT DOCUMENTS

| 5,098,979 | A | 3/1992 | O'Lenick, Jr. |
| 6,589,519 | B1 | 7/2003 | Restle et al. |
| 6,730,766 | B2 | 5/2004 | Schattenmann et al. |
| 2002/0103094 | A1* | 8/2002 | Masschelein et al. ....... 510/276 |
| 2003/0022982 | A1 | 1/2003 | Yu et al. |
| 2003/0096728 | A1* | 5/2003 | Zhang et al. ................. 510/466 |
| 2004/0048996 | A1 | 3/2004 | Lange et al. |

FOREIGN PATENT DOCUMENTS

| EP | 0837103 | 4/1998 |
| EP | 0837104 | 4/1998 |
| WO | 02/10256 | 2/2002 |
| WO | 02/10257 | 2/2002 |
| WO | 02/10259 | 2/2002 |

OTHER PUBLICATIONS

International Search Report for PCT/EP2004/050797 dated Aug. 5, 2004, two pages.

* cited by examiner

*Primary Examiner*—Kuo-Liang Peng
(74) *Attorney, Agent, or Firm*—Rankin, Hill & Clark LLP

(57) ABSTRACT

The invention provides silicone compositions (aminopolysiloxanes and/or ammonium polysiloxanes) which bind to fibrous substrates such as paper, and make the paper perceptibly softer and permit easy use of the paper in the paper production process, by leaving constant or improving hydrophilicity. The invention further provides polysiloxane-based compositions which can be flexibly adjusted to a given substrate and treatment condition by varying the ratios of the components of the composition.

30 Claims, 1 Drawing Sheet

POLYORGANOSILOXANE COMPOSITIONS FOR THE TREATMENT OF SUBSTRATES

The present invention relates to polyorganosiloxane compositions, processes for their preparation, their use for the treatment of substrates, in particular fibrous substrates, and products containing them, in particular paper products, such as nonwoven paper fabrics, paper pulps, woven paper fabrics, paper carriers or paper layers.

BACKGROUND OF THE INVENTION

Softness is an advantage for absorptive papers in many applications. For example, untreated paper tissues in contact with the skin, such as makeup removal tissues or paper handkerchiefs, can lead to reddening of the skin due to mechanical damage on frequent use, and indeed even to skin irritation.

Improved softness can be obtained by changing the paper tissue itself or by treating the fibers or the tissue with chemical substances. Polydimethylsiloxanes (silicones) are frequently used for treating the paper fibers or the paper tissue.

Owing to the hydrophobic nature of the polydimethylsiloxanes, the finishing of paper fibers or paper tissues leads to water repellent properties of the paper tissue. This is as a rule undesired since the ability of the tissue to rapidly absorb water is reduced.

Various methods for achieving a softening finish while retaining the hydrophilic properties are therefore described.

U.S. Pat. No. 5,538,595 describes the use of a two-component softener composition for paper, which comprises an ester-functional quaternary ammonium compound and organofunctional polyorganosiloxanes.

U.S. Pat. No. 6,054,020 discloses amino-modified polyorganosiloxane compounds and mixtures thereof in which the amino modification is effected exclusively in the side chains of a polyorganosiloxane main chain. Woven fabric surfaces are treated with the amino-modified polyorganosiloxane compounds in order to provide a use which is gentle on the skin.

Similarly, U.S. Pat. No. 6,432,270 discloses paper tissues which contain amino-modified polyorganosiloxanes having amino side chains and optionally terminal amino groups.

U.S. Pat. No. 6,030,675 discloses soft paper tissues which contain ammonium-modified polyorganosiloxanes having polyetherammonium side chains.

In the treatment of paper, transfer or migration of the softening chemicals to the user's skin is undesired. Strong binding of the softening but in particular of the hydrophilizing component is therefore desirable. Although polyethersiloxanes have a strongly hydrophilizing effect on substrate surfaces, there are no strongly binding groups with respect to paper surfaces, and moreover the more or less pronounced water solubility means that they are not very suitable since they a low substantivity.

An improved binding to the cellulose surfaces containing hydroxyl groups can be achieved, for example, by aminoalkylsiloxanes, in particular by siloxanes having tetraorgano-substituted ammonium groups, i.e. quaternized groups which are present independently of pH and can provide the bonds owing to the strong charge interaction between the negative paper fiber surface and the permanently positive charges of the quaternary ammonium groups of the silicone molecule.

WO 02/10256, WO 02/10257 and WO 02/10259 claim silicone material which permit softening of textiles during the washing process with such detergent systems. The US Published Specification 2002/0103094 discusses the use of said silicone materials in textile care formulations.

It is the object of the present invention to provide silicone compositions which have in particular good binding to the fibers (substantivity), make the paper perceptibly softer without giving rise to a significant hydrophobic character of the paper and permit easy use of the paper in the paper production process, i.e. for example are liquid.

It is furthermore the object of the present invention to provide silicone compositions which achieve further improvement with regard to the achievable softness of the treated fibers, in particular with constant or improved hydrophilic properties and substantivity (adhesion of the siloxane systems to the fibers), the flexibility of the formulation of the siloxane systems and the dosage form, in particular toward a reduction in the amounts which have to be used and in the material costs.

It is a further object of the invention to provide polysiloxane-based compositions which can be flexibly adjusted to the type of substrates to be treated and the treatment conditions by simply varying the ratios of the components present in the composition. Furthermore, the formulations should make it possible to reduce the amounts required for achieving the desired properties of the substrate to be treated and/or the use of expensive polysiloxane components, such as, for example, so-called polysiloxane quats having organofunctional groups in the α,ω-position (R'Me$_2$SiO$_{0.5}$), without there being any deterioration of the desired properties, such as softness and hydrophilic properties of the substrates to be treated.

A further object is to provide compositions which are suitable for the treatment of hard surfaces, in particular for antistatic treatment.

It was surprisingly found that a certain composition of different polysiloxane-containing compounds can achieve the above object and are economical and yet extremely effective compositions for the treatment, in particular surface treatment, of certain materials, such as, in particular, fiber materials, but also hard surfaces.

DESCRIPTION OF THE INVENTION

Figure 1:
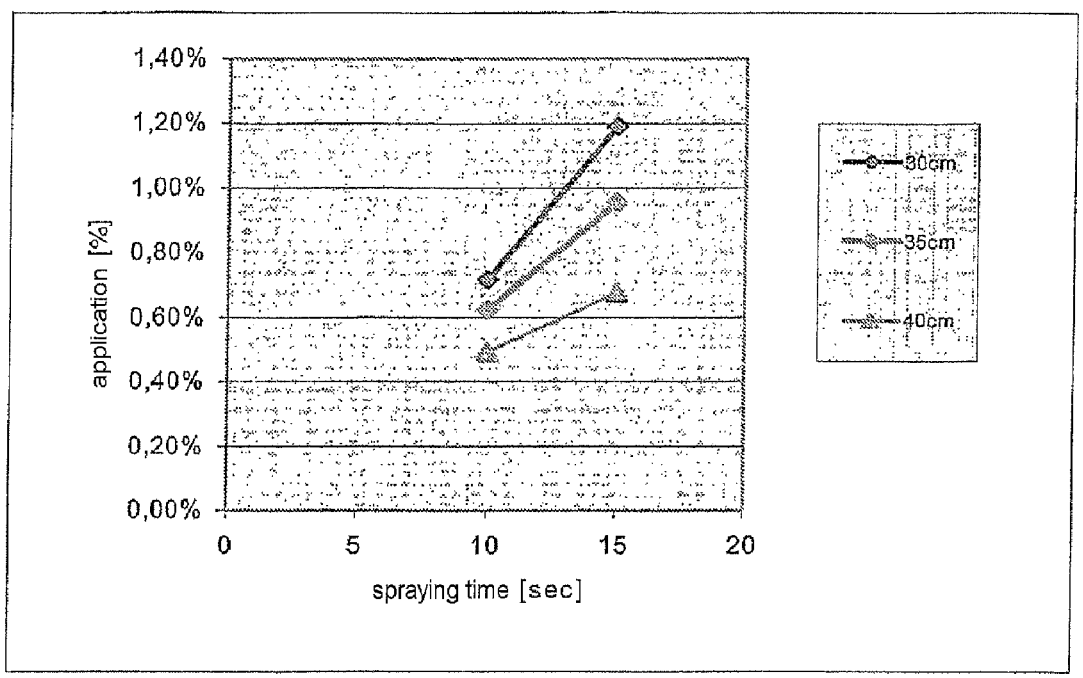
FIG. 1: Application of nonvolatile constituents as a function of time and distance of the spraying process.

The present invention therefore provides a polyorganosiloxane composition containing at least one amino- and/or ammonium-polysiloxane compound a1) containing at least one amino and/or ammonium group Q and at least one organic radical V, with the proviso that at least one organic radical V is an organic radical V$^{Si1}$ containing a polydiorganosiloxane group, wherein the binding of the group Q to the group V$^{Si1}$ is effected by the structural element (I)

wherein V* is a divalent organic radical which in each case is bonded via a carbon atom to the silicon atom of the polydiorganosiloxane radical and to the nitrogen atom of the amino or ammonium group Q, and R is a monovalent organic radical, and at least one amino- and/or ammonium-polysiloxane compound a2) containing at least one amino or ammonium group Q and at least one organic radical V, with the proviso that at least one organic radical V is an organic radical $V^{Si2}$ containing a polydiorganosiloxane group, wherein the binding of the group Q to the group $V^{Si2}$ is effected by the structural element selected from the formulae (II) and (III)

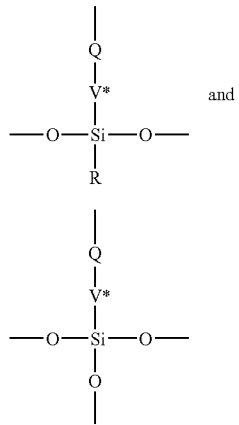

wherein V* is in each case a divalent organic radical which in each case is bonded via a carbon atom to the silicon atom of the organosiloxane radical and to the nitrogen atom of the amino or ammonium group Q, and R is a monovalent organic radical, with the proviso that the amino- and/or ammonium-polysiloxane compound a2) has no structural element of the formula (I), and with the proviso that the group Q does not bond to a carbonyl carbon atom, and wherein the positive charges resulting from ammonium groups are neutralized by organic or inorganic acid anions, and the acid addition salts thereof.

In a preferred embodiment, the polyorganosiloxane composition according to the invention is characterized in that it contains no nitrogen-free polysiloxane compound.

In a preferred embodiment, the polyorganosiloxane composition according to the invention is characterized in that it consists of:

the component a1) as defined above, the component a2) as defined above, optionally one or more silicone-free surfactants b), optionally one or more auxiliaries c) and optionally one or more carrier substances d).

In a preferred embodiment, the polyorganosiloxane composition according to the invention characterized in that the components a1) and a2) are present in a weight ratio of from 30:1 to 1:90. Particularly preferably, the components a1) and a2) are present in a weight ratio of from 1:0.1 to 1:10, preferably in a weight ratio of from 1:0.2 to 1:7. A particularly preferred range is a mixing ratio of 1:1.

The amino- and/or ammonium-polysiloxane compounds a1) are expediently composed of at least one amino and/or ammonium group Q and/or at least one organic radical V. At least one group V contains a polyorganosiloxane group, which is designated as $V^{Si}$. This the group $V^{Si}$ has, for binding to the group Q, the structural element (I) of the formula (I)

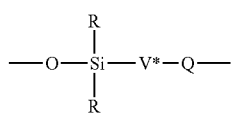

wherein V* and R are as defined above.

In a preferred embodiment of the invention, the structural element of the formula (I) has the following formula (Ia):

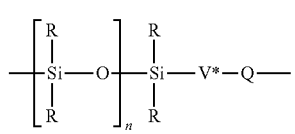

wherein V*, R and n≧1. In embodiments in which a branched polydiorganosiloxane unit is used, as described further below, constituents R in the polyorganosiloxane unit which is adjacent to the structural unit of the formula (I) can be replaced by siloxane units.

In a preferred embodiment, the polyorganosiloxane compositions according to the invention have amino- and/or ammonium-polysiloxane compounds a1) of the formula (IV):

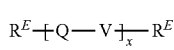

wherein Q and V are as defined above, $R^E$ is in each case a monovalent organic radical or hydrogen, x is ≧1, the radicals $R^E$ may be identical or different from one another and, if x is >1, the groups Q, V may in each case may be identical or different from one another.

In a further preferred embodiment of the polyorganosiloxane composition according to the invention, the amino or ammonium group Q is selected from the group consisting of:

—$NR^1$—,

—$N^+R^1_2$—, a saturated or unsaturated, diamino-functional heterocycle optionally substituted by further substituents of the formulae:

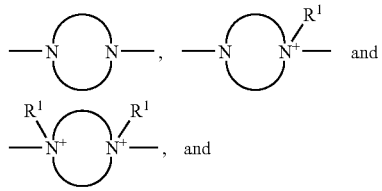

an aromatic, optionally substituted diamino-functional heterocycle of the formula:

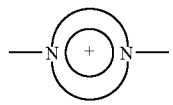

a trivalent radical of the formula:

a trivalent radical of the formula:

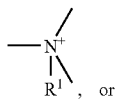

or a tetravalent radical of the formula

wherein $R^1$ in each case is hydrogen or a monovalent organic radical, Q not bonding to a carbonyl carbon atom.

In a further preferred embodiment of the polyorganosiloxane composition according to the invention, the unit V is selected from at least one polyvalent, straight-chain, cyclic or branched, saturated, unsaturated or aromatic hydrocarbon radical having up to 1000 carbon atoms (the carbon atoms of the optionally present polyorganosiloxane radical not being counted) which optionally may contain one or more groups selected from

—O—, —C(O)—, —C(S)—,

—$NR^2$—, wherein $R^2$ is hydrogen, a monovalent, straight-chain, cyclic or branched, saturated, unsaturated or aromatic hydrocarbon radical having up to 300 carbon atoms which may contain one or more groups selected from —O—, —NH—, —C(O)— and —C(S)—, and which is optionally by one or more substituents selected from the group consisting of a hydroxyl group, an optionally substituted, heterocyclic group preferably containing one or more nitrogen atoms, polyether radicals, polyetherester radicals, polyorganosiloxanyl radicals and —$Si(OR)_{3-a}(R)_a$, wherein a is an integer from 0 to 2 and R is as defined above, where, if a plurality of groups —$NR^2$— is present, these may be identical or different, and with the proviso that the group —NH— binds to a carbonyl and/or thiocarbonyl carbon atom,

and may contain polyorganosiloxane radicals, and which optionally may be substituted by one or more hydroxyl groups, with the proviso that the groups

and —$NR^2$— bind to at least one carbonyl and/or thiocarbonyl carbon atom, and with the proviso that at least one radical V contains at least one polyorganosiloxane radical.

In a further preferred embodiment of the polyorganosiloxane composition according to the invention, the amino- and/or ammonium-polysiloxane compound a1) has at least three units selected from the units Q and V, wherein Q is at least one di-, tri- and/or tetravalent amino and/or ammonium group which is not bonded to V via a carbonyl carbon atom, and V is at least one organic radical which is linked to the Q units via carbon, with the proviso that at least one of the units V contains a polyorganosiloxane radical.

In a further preferred embodiment of the polyorganosiloxane composition according to the invention, the amino- and/or ammonium-polysiloxane compound a1) has at least two units Q.

In a further preferred embodiment of the polyorganosiloxane composition according to the invention, the amino- and/or ammonium-polysiloxane compound a1) has at least two units Q and more than one unit $V^{Si}$.

In a further preferred embodiment of the polyorganosiloxane composition according to the invention, the amino- and/or ammonium-polysiloxane compound a1) has at least two units Q and more than two units $V^{Si}$.

In a further preferred embodiment of the polyorganosiloxane composition according to the invention, the organic radical V in the amino- and/or ammonium-polysiloxane compound a1) is at least one constituent which is selected from the group consisting of $V^1$, $V^2$ and $V^3$, wherein $V^2$ is selected from divalent, straight-chain, cyclic or branched, saturated, unsaturated or aromatic hydrocarbon radicals having up to 1000 carbon atoms (the carbon atoms of the polysiloxane radical $Z^2$ defined below not being counted) which optionally may contain one or more groups selected from

—O—, —CONH—,

—$CONR^2$—, wherein $R^2$ is hydrogen, a monovalent, straight-chain, cyclic or branched, saturated, unsaturated or aromatic hydrocarbon radical having up to 100 carbon atoms which may contain one or more groups selected from —O—, —NH—, —C(O)— and —C(S)—, and which may be optionally substituted by one or more substituents selected from the group consisting of a hydroxyl group, an optionally substituted heterocyclic group preferably containing one or more nitrogen atoms, amino, alkylamino, dialkylamino, ammonium, polyether radicals and polyetherester radicals, where, if a plurality of groups —$CONR^2$ is present, these may be identical or different, may contain -C(O)— and —C(S)—, the radical $V^2$ may be optionally substituted by one or more hydroxyl groups, and the radical $V^2$ at least one group —$Z^2$— of the formula

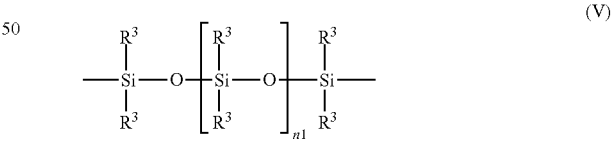

(V)

wherein $R^3$ may be identical or different and is selected from the group which consists of $C_1$ to $C_{22}$ alkyl, fluoro($C_3$-$C_{10}$) alkyl, $C_6$-$C_{10}$ aryl and n1 is 20 to 1000, $V^1$ is selected from divalent, straight-chain, cyclic or branched, saturated, unsaturated or aromatic hydrocarbon radicals having up to 1000 carbon atoms which optionally may contain one or more groups selected from

—O—, —CONH—,

—$CONR^2$—, wherein $R^2$ is as defined above, it being possible for the groups $R^2$ in the groups $V^1$ and $V^2$ to be identical or different, may contain —C(O)—, —C(S)— and —Z$^1$—, wherein —Z$^1$— is a group of the formula

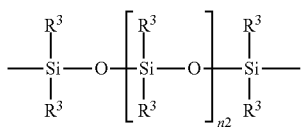
(VI)

wherein

R$^3$ is as defined above, it being possible for the groups R$^3$ in the groups V$^1$ and V$^2$ to be identical or different, and n2 is 0 to 19, and the radical V$^1$ may be optionally substituted by one or more hydroxyl groups, and V$^3$ is a trivalent or higher-valent, straight-chain, cyclic or branched, saturated, unsaturated or aromatic hydrocarbon radical having up to 1000 carbon atoms (the carbon atoms of the siloxane radicals Z$^1$, Z$^2$ and Z$^3$ mentioned below not being counted) which optionally may contain one or more groups selected from —O—, —CONH—, —CONR$^2$—, wherein R$^2$ is as defined above, —C(O)—, —C(S)—, Z$^1$, which is as defined above, —Z$^2$—, which is as defined above, and Z$^3$, wherein Z$^3$ is a trivalent or higher-valent organopolysiloxane unit, and which may optionally be substituted by one or more hydroxyl groups, it being possible in each case for one or more groups V$^1$, one or more groups V$^2$ and/or one or more groups V$^3$ to be present in said polysiloxane compound, with the proviso that said polysiloxane compound contains at least one group V$^1$, V$^2$ or V$^3$ which contains at least one group —Z$^1$—, —Z$^2$— or —Z$^3$.

The trivalent and tetravalent radicals Q either serve for branching of the main chain formed from Q and V, so the valences which do not serve for bonding in the main chain carry further branches formed from -[Q-V]— units, or the trivalent and tetravalent radicals Q become saturated with radicals V$^3$ within a linear main chain without formation of a branch, with formation of cyclic structures.

The amino- and/or ammonium-polysiloxane compound a1) defined above preferably comprises polysiloxane compounds which contain at least one unit of the formula (VII):

(VII)

wherein Q is selected from the divalent radicals which consists of:

—NR$^1$—,
—N$^+$R$^1{}_2$— a saturated or unsaturated diamino-functional heterocycle of the formulae:

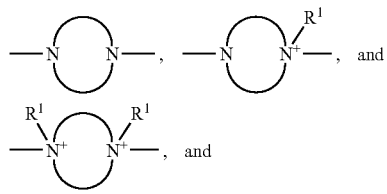
and an aromatic diamino-functional heterocycle of the formula:

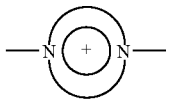

wherein R$^1$ is hydrogen or a monovalent organic radical, Q is not binding to a carbonyl carbon atom, V is at least one constituent selected from the group consisting of V$^1$, V$^2$ and V$^3$, wherein V$^2$ is selected from divalent, straight-chain, cyclic or branched, saturated, unsaturated or aromatic hydrocarbon radicals having up to 1000 carbon atoms (the carbon atoms of the siloxane radical Z$^2$ mentioned below not being counted) which optionally may contain one or more groups selected from

—O—,

—CONR$^2$—, wherein R$^2$ is hydrogen, a monovalent, straight-chain, cyclic or branched, saturated, unsaturated or aromatic hydrocarbon radical having up to 100 carbon atoms which may contain one or more groups selected from —O—, —NH—, —C(O)— and —C(S)—, and which may be optionally substituted by one or more substituents selected from the group consisting of a hydroxyl group, an optionally substituted heterocyclic group preferably containing one or more nitrogen atoms, amino, alkylamino, dialkylamino, ammonium, polyether radicals and polyetherester radicals, where, if a plurality of groups —CONR$^2$ is present, these may be identical or different, may contain —C(O)— and —C(S)—, the radical V$^2$ may be optionally substituted by one or more hydroxyl groups, and the radical V$^2$ contains at least one group —Z$^2$— of the formula

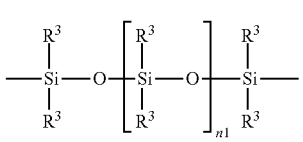
(V)

wherein R$^3$ may be identical or different and is selected from the group consisting of C$_1$ to C$_{22}$ alkyl, fluoro(C$_3$-C$_{10}$) alkyl and C$_6$-C$_{10}$ aryl, and n1 is 20 to 1000, V$^1$ is selected from divalent, straight-chain, cyclic or branched, saturated, unsaturated or aromatic hydrocarbon radicals having up to 1000 carbon atoms which optionally may contain one or more groups selected from

—O—,

—CONR$^2$—, where R$^2$ is as defined above, it being possible for the groups R$^2$ in the groups V$^1$ and V$^2$ to be identical or different, may contain —C(O)—, —C(S)— and —Z$^1$—, wherein —Z$^1$— is a group of the formula

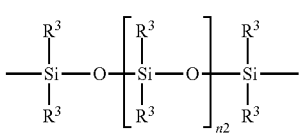
(VI)

wherein R$^3$ is as defined above, it being possible for the groups R$^3$ in the groups V$^1$ and V$^2$ to be identical or different, and n2 is 0 to 19, and the radical V$^1$ may optionally be substituted by one or more hydroxyl groups, and if one of the groups $V^1$, $V^2$ or $V^3$ contains one of the groups —$Z^1$—, —$Z^2$— or $Z^3$, it is a group $V^{Si}$ mentioned above, the binding of which to the groups Q is effected by means of the structural element of the formula (I) explained above.

The preferred polysiloxane compounds a1) which contain at least one unit of the formula (VII), are terminated by monofunctional groups -Q-$R^E$ and/or V—$R^E$, wherein $R^E$ is as defined above, as shown, for example, in the compound a1) of the formula (IV).

The preferred polysiloxane compounds a1) which contain at least one unit of the formula (VII), should in the context of the invention also include the case where only one unit -[Q-V]— is present, so that compounds of the formulae $R^E$—V[Q-V]—$R^E$ or $R^E$[Q-V]-Q-$R^E$ are also included.

Suitable polyamino- and/or polyammonium-polysiloxane compound a1) are described, for example, in WO 02/10257, WO 02/10259, DE-OS (German Published Specification) 100 36 522, DE-OS (German Published Specification) 100 36 532, WO 02/18528, DE-OS (German Published Specification) 100 36 533 and the unpublished German Application 102 12 470.1. They may furthermore be compounds according to U.S. Pat. No. 6,240,929.

The polysiloxane compounds which contain at least one unit of the formula (VII) are, for example, linear polysiloxane copolymers of the general formula (VII'):

-[Q-V]— (VII')

wherein Q is as defined above,
V is at least one group $V^1$ and at least one group $V^2$
wherein $V^1$ and $V^2$ are as defined above.

In the general formulae (VII) and (VII'), the molar ratio of the groups $V^1$ and $V^2$ in the polysiloxane compounds $V^2/V^1$ can per se assume any desired value. According to the invention, the case where the polysiloxane compound of the formulae (VII) or (VII') contains only $V^2$ units is therefore also included, i.e. the polysiloxane compound has the formula -[Q-$V^2$]—. The case where the polysiloxane compound contains only $V^1$ units is also included according to the invention. In this case, the $V^1$ units must, however, contain $Z^1$ siloxane units.

In a preferred embodiment of the invention, however, the polysiloxane compound of the formulae (VII) or (VII') contains both $V^2$ and $V^1$ units.

In a further preferred embodiment of the compounds a1) of the present invention, the molar ratio of the groups $V^1$ and $V^2$ in the polysiloxane compounds of the general formulae (VII) or (VII') is:

$V^2/V^1=1$.

Such linear amine- or tetraorgano-ammonium compounds have been described as component a1), for example in WO 02/10257, WO 02/10259, EP 282720 or U.S. Pat. No. 5,981,681. Particularly preferred are the polysiloxanes of WO 02/10259 and of WO 02/10257, the polysiloxane polymers of which, defined in claim 1, are hereby incorporated expressly by reference, and which are part of the disclosure of the present Application.

In a further embodiment of the linear polysiloxane compounds of the formula (VII) or (VII'), $V^2/V^1$ is not equal to 1, preferably $V^2/V^1$ is <1, more preferably <0.9, even more preferably $V^2/V^1$ fulfils the relationship $0.0005<V^2/V^1<0.5$.

The group R is preferably selected from the groups $R^2$.

In a preferred embodiment of the invention, the divalent radical Q in the formulae (VII) or (VII') is selected from the group consisting of:
a quaternized imidazole unit of the structure

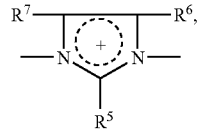

a quaternized pyrazole unit of the structure

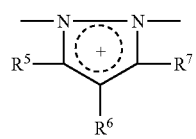

a diquaternized piperazine unit of the structure

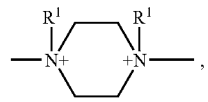

a monoquaternized piperazine unit of the structure

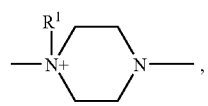

a monoquaternized piperazine unit of the structure

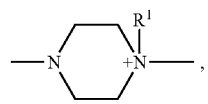

a diquaternized unit of the structure

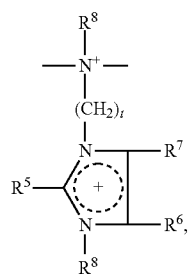

a monoquaternized unit of the structure

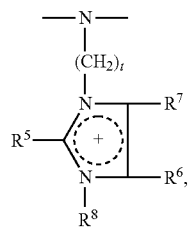

a monoquaternized unit of the structure

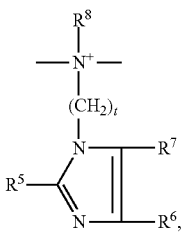

a diquaternized unit of the structure

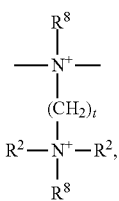

a monoquaternized unit of the structure

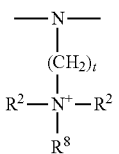

and a monoquaternized unit of the structure

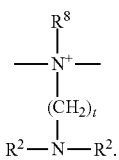

wherein t is from 2 to 10, $R^2$ is as defined above, and the meaning of $R^2$ may be identical to or different from the meaning of the above group $R^2$, and, if a plurality of $R^2$ is present in one of the structural elements described above, these may be identical or different from one another, two groups $R^2$ together with the positively charged nitrogen atom form a five- to seven-membered heterocycle which optionally may additionally have one or more nitrogen, oxygen and/or sulfur atoms, $R^5$, $R^6$, $R^7$ being identical or different and are selected from the group consisting of: H, halogen, hydroxyl group, nitro group, cyano group, thiol group, carboxyl group, alkyl group, monohydroxyalkyl group, polyhydroxyalkyl group, thioalkyl group, cyanoalkyl group, alkoxy group, acyl group, acetyloxy group, cycloalkyl group, aryl group, alkylaryl group and groups of the type —NHR$^W$, in which R$^W$ are H, alkyl group, monohydroxyalkyl group, polyhydroxyalkyl group, acetyl group or ureido group, and in each case two of the neighboring radicals $R^5$, $R^6$ and $R^7$ may form aromatic five- to seven-membered rings with the carbon atoms binding them to the heterocycle, and $R^8$ has the meaning of $R^2$, it being possible for $R^8$ and $R^2$ to be identical or different.

In a preferred embodiment of the polysiloxane compounds of the formula (VII) or (VII') as components a1), $V^2$ is a group of the formula

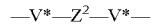

wherein $Z^2$ and V* is as defined above, and V* is preferably a divalent, straight-chain, cyclic or branched, saturated, unsaturated or aromatic hydrocarbon radical having up to 100, preferably 40, carbon atoms, which optionally may contain one or more groups selected from —O—, —CONH—, —CONR$^2$—, wherein $R^2$ is as defined above, —C(O)— and —C(S)—, and the radical V* may be optionally substituted by one or more hydroxyl groups. The last-mentioned preferred embodiment V* is also considered to be a preferred embodiment of the structural element (I), as defined above.

In the abovementioned embodiment, the linear polysiloxane copolymer according to the invention may therefore have the following repeating units —[V*—Z$^2$—V*-Q]-, preferably together with —[V$^1$-Q]-.

The molar ratio of the repeating units —[V*—Z$^2$—V*-Q]- to —[V$^1$-Q]-, i.e. the ratio of $V^2/V^1$, can, as mentioned above, be 1, but, in an embodiment, is preferably not equal to 1, more preferably <0.5. In the latter case, said linear polysiloxane copolymers -[Q-V]— must contain blocks which contain more than one —[V$^1$-Q]- unit linked to one another.

As explained in more detail further below in relation to the process for the preparation of the linear polysiloxane copolymers described above as component a1), the block-like sequences which have more than one —[V$^1$-Q]- unit linked to one another can, depending on the method of preparation, be linked in a regular manner to the $V^2$-Q units or in an irregular manner to the $V^2$-Q units.

This means the following:

In the case of the regular linkage, where, for example, a prepolymer corresponding to the group -Q[V$^1$-Q]$_x$- is reacted with monomer units corresponding to $V^2$ in the molar ratio 1:1, the linear polysiloxane copolymers can be represented as follows:

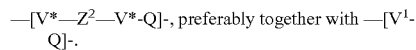

x may be 2 to 2000 and is the mean value of the distribution.

The linear polysiloxane copolymers represented by the formula —{{V$^2$-Q-[V$^1$-Q]$_x$-}}- are characterized in that they have substantially no —V$^2$-Q units linked to one another or, in other words, two —V$^2$-Q units are always interrupted by at least one —V$^1$-Q- unit.

In the case of the irregular linkage, where, for example, monomers corresponding to Q units is reacted with monomer units corresponding to V$^1$ and monomer units corresponding to V$^2$ in the ratio Q/(V$^1$+V$^2$), with, for example, V$^2$/V$^1$<1, preferably <0.5, of 1:1, the linear polysiloxane copolymers can be represented as follows:

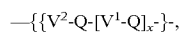

wherein V is the ratio $V^2/V$<1 or <0.5. The groups $V^1$ and $V^2$ are randomly distributed over the copolymer chain. In contrast to the linear polysiloxane copolymers prepared by the regular linkage, this copolymer may also have neighboring -Q-V$^2$— units.

In a preferred embodiment of the polysiloxane compound of the formula (VII) or (VII') which is used according to the invention as component a1), the group $V^1$ is selected from divalent, straight-chain, cyclic or branched, saturated, unsaturated or aromatic hydrocarbon radicals having up to 400 carbon atoms which optionally may contain one or more groups selected from —O—, —CONH—, —CONR$^2$—, wherein R$^2$ is as defined above, —C(O)—, —C(S)— and —Z$^1$—, wherein —Z$^1$— is a group of the formula (VI)

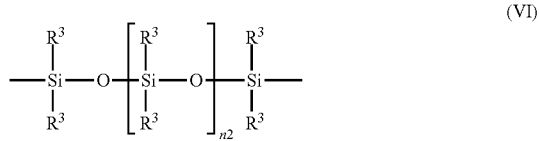
(VI)

wherein
R$^3$ is C$_1$-C$_{18}$-alkyl, which may be optionally substituted by one or more fluorine atoms, or is phenyl, and n$_2$ is as defined above.

In a further preferred embodiment of the polysiloxane compounds of the formula (VII) or (VII') as component a1), the group Q is selected from:

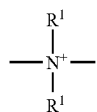

a quaternized imidazole unit of the structure

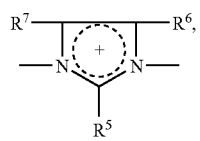

a quaternized pyrazole unit of the structure

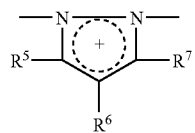

a diquaternized piperazine unit of the structure

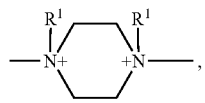

a monoquaternized piperazine unit of the structure

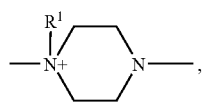

a monoquaternized piperazine unit of the structure

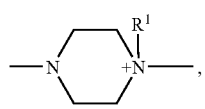

a monoquaternized piperazine unit of the structure

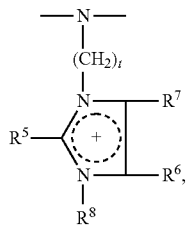

wherein R$^1$, R$^5$, R$^6$, R$^7$ and R$^8$ are as defined above.

In a further preferred embodiment of the linear polysiloxane compounds of the formula (VII') as component a1) of the present invention, the molar ratio V$^2$/V$^1$ fulfils the relationship 0.0005<V$^2$/V$^1$<0.5, (=2<V$^1$/V$^2$<2000)

more preferably the relationship 0.005<V$^2$/V$^1$<0.4, (=2.5<V$^1$/V$^2$<200)

even more preferably the relationship 0.01<V$^2$/V$^1$<0.3, (=3.3<V$^1$/V$^2$<100)

In the formulae (VII) and (VII'), preferably:
R$^1$=C$_1$ to C$_{18}$ alkyl, in particular methyl, ethyl, trifluoropropyl and phenyl,
n$_1$=20 to 400, particularly preferably 20 to 300, especially 20 to 200. In a further preferred embodiment, n$_1$ is between 20 and 50 or between 80 and 200. The number n$_1$ is the mean degree of polymerization of M$_n$ of the diorganosilyloxy units in the group Z$^2$.
n$_2$=0 to 15, particularly preferably 0 to 10, especially 0 to 5, more especially 0. The number n$_2$ is the mean degree of polymerization of M$_n$ of the diorganosilyloxy units in the group Z$^1$,
V*=a divalent straight-chain, cyclic or branched, saturated, unsaturated C$_3$ to C$_{16}$ hydrocarbon radical or aromatic C$_8$ to C$_{20}$ hydrocarbon radical which optionally may contain one or more groups selected from —O—, —CONH—, —CONR$^2$—, —C(O)—, —C(S)— and may be substituted by one or more OH group, wherein R$^2$ is as defined above,

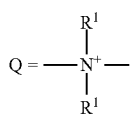

a quaternized imidazole unit of the structure

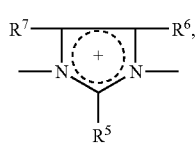

a diquaternized piperazine unit of the structure

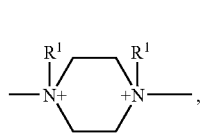

a monoquaternized piperazine unit of the structure

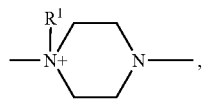

a monoquaternized piperazine unit of the structure

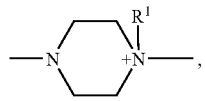

a monoquaternized unit of the structure

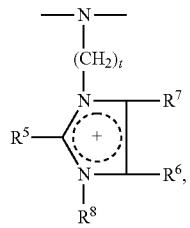

wherein $R^1$, $R^5$, $R^6$, $R^7$ and $R^8$ are as defined above.

Particularly preferably,

V* is a divalent straight-chain, cyclic or branched, saturated, unsaturated or aromatic hydrocarbon radical having up to 16 carbon atoms which may contain one or more groups selected from —O—, —CONH—, —CONR²—, wherein $R^2$ is as defined above, may contain —C(O)—, —C(S)— and may be substituted by one or more hydroxyl groups. Even more preferably, —V*— is selected from the groups of the formulae:

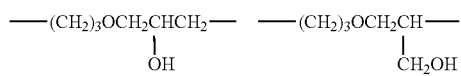
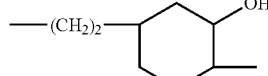
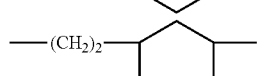
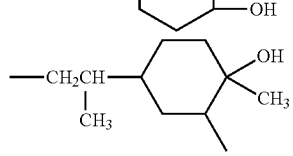
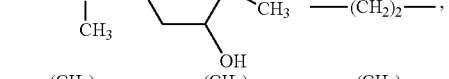
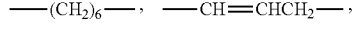
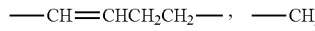
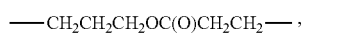
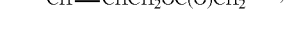
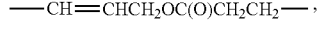

—CH₂CH₂CH₂(OCH₂CH₂)ᵥ(OCH₂CH)ᵥOC(O)CH₂—  
                                     |CH₃

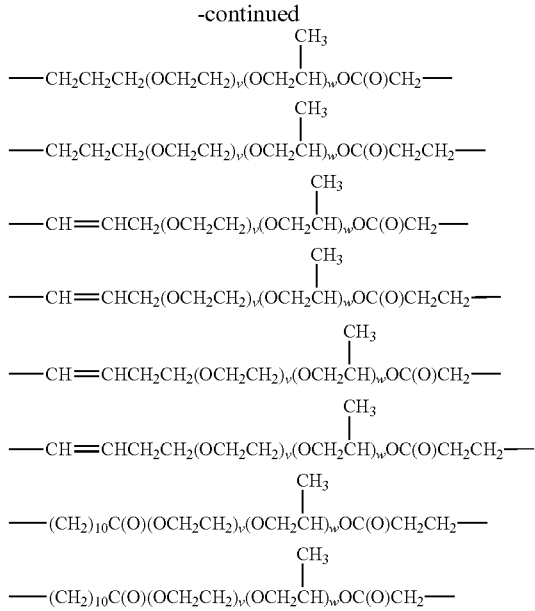

where $v+w \geq 0$, $R^1$ is preferably: H, —CH₃, —CH₂CH₃, —(CH₂)₂CH₃—, —(CH₂)₃CH₃, —(CH₂)₅CH₃, —CH₂CH₂OH,

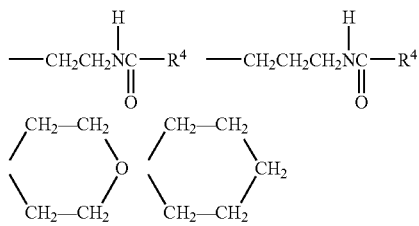

where $R^4$=straight-chain, cyclic or branched $C_1$ to $C_{18}$ hydrocarbon radical which may contain by one or more groups selected from —O—, —NH—, —C(O)— and —C(S)— and may be substituted by one or more OH groups, especially unsubstituted $C_5$ to $C_{17}$ hydrocarbon radicals which are derived from the corresponding fatty acids, or hydroxylated $C_3$ to $C_{17}$ radicals which can be attributed to hydroxylated carboxylic acids, especially saccharidecarboxylic acids and very especially are

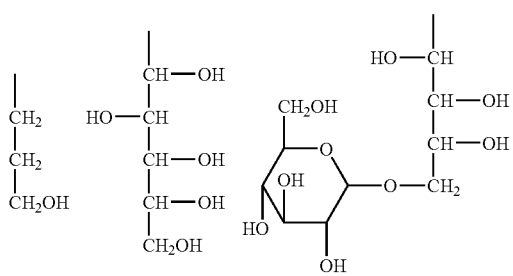

Furthermore, $R^1$ may be:

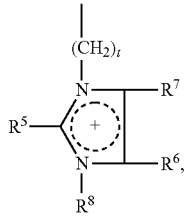

wherein t, $R^5$ to $R^8$ are as defined above,

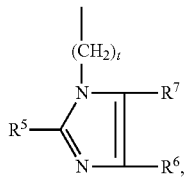

wherein t, $R^5$ to $R^7$ are as defined above,

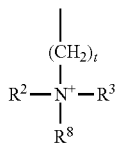

wherein t, $R^2$, $R^3$ and $R^8$ are as defined above.

$V^1$ is preferably
- $-R^9-$, wherein $R^9$ is a divalent, saturated or mono- or polyunsaturated, straight-chain or branched hydrocarbon radical having two to 25 carbon atoms,
- $-(CH_2)_uC(O)O-[(CH_2CH_2O)_q-(CH_2CH(CH_3)-O)_r]-C(O)(CH_2)_u-$
- $-(CH_2)_uC(O)O-R^9-O-C(O)(CH_2)_u-$, wherein $R^9$ is as defined above,
- $-(CH_2)_uR^{10}-(CH_2)_u-$, wherein $R^{10}$ is an aromatic group,
- $-[CH_2CH_2O]_q-[CH_2CH(CH_3(O)]_r-CH_2CH_2-$,
- $-CH(CH_3)CH_2O[CH_2CH_2O]_q-[CH_2CH(CH_3)O]_r-CH_2CH(CH_3)-$
- $-CH_2CH(OH)CH_2-$,
- $-CH_2CH(OH)(CH_2)_2CH(OH)CH_2-$,
- $-CH_2CH(OH)CH_2OCH_2CH(OH)CH_2OCH_2CH(OH)CH_2-$ and
- $-CH_2CH(OH)CH_2O-[CH_2CH_2O]_q-[CH_2CH(CH_3)O]_r-CH_2CH(OH)CH_2-$ wherein u is from 1 to 3, q and r are from 0 to 200, preferably from 0 to 100, more preferably from 0 to 70 and particularly preferably from 0 to 40, and q+r is >0.

Preferred $V^1$ groups are organic divalent radicals having more than 10 carbon atoms, which furthermore preferably have more than one —O— or —S— atom per unit $V^1$.

Preferred variants of $V^1$ are structures of the formulae:

$-CH_2C(O)O-[CH_2CH_2O]_q-[CH_2CH(CH_3)O]_r-C(O)CH_2-$, $CH_2CH_2C(O)O-[CH_2CH_2O]_q-[CH_2CH(CH_3)O]_r-C(O)CH_2CH_2-$, $-CH_2CH_2CH_2C(O)O-[CH_2CH_2O]_q-[CH_2CH(CH_3)O]_r-C(O)CH_2CH_2-$, esterified alkylene, alkenylene, alkynylene units, especially having the structures $CH_2C(O)-[CH_2]_o-OC(O)CH_2-$, $-CH_2CH_2C(O)O-[CH_2]_o-OC(O)CH_2CH_2-$, $-CH_2CH_2CH_2C(O)O-[CH_2]_oOC(O)CH_2CH_2CH_2-$, $-CH_2C(O)O-CH_2C\equiv CCH_2-OC(O)CH_2-$, $-CH_2CH_2C(O)O-CH_2C\equiv CCH_2-OC(O)CH_2CH_2-$, $-CH_2CH_2CH_2C(O)O-CH_2C\equiv CCH_2-OC(O)CH_2CH_2CH_2-$, $-CH_2C(O)O-CH_2CH=CHCH_2-OC(O)CH_2-$, $-CH_2CH_2C(O)O-CH_2CH=CHCH_2-OC(O)CH_2CH_2-$, $-CH_2CH_2CH_2C(O)O-CH_2CH=CHCH_2-OC(O)CH_2CH_2CH_2-$, alkylene, alkenylene, alkynylene and arylene units, especially having the structures:

$-[CH_2]_o-$ where o=2 to 6, $-CH_2C\equiv CCH_2-$, $-CH_2CH=CHCH_2-$, $-CH(CH_3)CH_2CH_2-$,

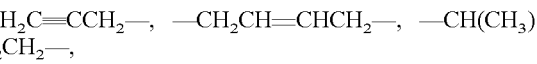

Polyalkylene oxide units, especially having the structures $-CH_2CH_2O]_q-[CH_2CH(CH_3)O]_r-CH_2CH_2-$, $-CH(CH_3)CH_2O[CH_2CH_2O]_q-[LCH_2CH(CH_3)O]_r-CH_2CH(CH_3)-$ having mono-, di- or polyhydroxy functional units, especially having the structures $-CH_2CH(OH)CH_2-$, $-CH_2CH(OH)(CH_2)_2CH(OH)CH_2-$, $-CH_2CH(OH)CH_2OCH_2CH(OH)CH_2OCH_2CH(OH)CH_2-$, $-CH_2CH(OH)CH_2O-[CH_2CH_2O]_q-[CH_2CH(CH_3)O]_r-CH_2CH(OH)CH_2-$ where q=0 to 200, r=0 to 200

Preferably q=1 to 50, in particular 2 to 50, especially 1 to 20, very especially 1 to 10, and 1 or 2, r=0 to 100, in particular 0 to 50, especially 0 to 20, very especially 0 to 10, and 0 or 1 or 2.

The linear polysiloxanes of the formulae (VII) or (VII') may be prepared, for example, by a process wherein a) at least one amine compound selected from a diamine compound and/or a primary or secondary monoamine compound are reacted with at least two difunctional organic compounds capable of reacting with the amino functions of the amine compound, the molar ratio of the organic compounds being chosen so that the desired ratio of $V^2/V^1$ is obtained, b) at least two moles of an amine compound selected from a diamine compound and/or a primary or secondary monoamine compound is reacted with one mole of a difunctional organic compound capable of reacting with the amino functions of the amine compound, with formation of a diamine compound (monomer), which is subsequently reacted with at least one amine compound, selected from a diamine compound and/or a primary or secondary monoamine compound, and at least one further difunctional organic compound capable of reacting with the amino functions of the amine compounds, c) an amine compound selected from a diamine compound and/or a primary or secondary monoamine compound is reacted with a difunctional organic compound capable of reacting with the amino functions of the amine compounds, with formation of a diamine compound (amino-terminated oligomer), which is subsequently reacted with at least one difunctional organic compound capable of reacting with the amino functions of the diamine compounds, d) an amine compound selected from a diamine compound and/or a primary or secondary monoamine compound is reacted with a difunctional organic compound capable of reacting with the amino functions of the amine compound, with formation of a difunctional compound (difunctional oligomer) capable of reacting with amino functions, which is subsequently reacted with at least one amine compound, selected from a diamine compound and/or a primary or secondary monoamine compound, and at least one further compound capable of reacting with amino functions, it optionally being possible to add monofunctional, preferably tertiary monoamines or suitable monoamines not capable of chain propagation and/or monofunctional compounds capable of reacting with amino functions as chain terminators, and the stoichiometry of the amino functions and of the functional groups capable of reacting with amino functions always being about 1:1 in the last stage of the reaction, and it being possible for any amino functions present to be protonated or quaternized.

Variant a), wherein at least one diamine compound selected from a diamine compound and/or a primary or secondary monoamine compound are reacted with at least two difunctional organic compounds capable of reacting with the amino functions of the amine compound, the molar ratio of the organic compounds being chosen so that the desired ratio of $V^2/V^1$, such as, for example, <0.5, is fulfilled, can thus be represented schematically, for example, as follows:

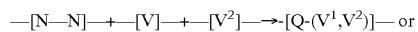

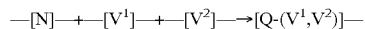

it being possible for —[N—N]— to include a cyclic diamine corresponding to the definition of Q or a $V^1$-containing diamine —[N—$V^1$—N]— or a $V^2$-containing diamine —[N—$V^2$—N]—, such as, in particular, —[N—$V^*$—$Z^2$—$V^*$—N]—, in each case the two Q units and one $V^1$ or two $V^2$ units being derived from the latter, and —[$V^1$]— and —[$V^2$]— being intended to be monomers corresponding to the repeating units $V^1$ and $V^2$, and —[N]— being a primary or secondary monoamine suitable for chain propagation.

At least one relatively highly alkylated amine or one quaternary ammonium unit Q being formed from the —[N—N]— and/or —[N]— units, it being possible for secondary or tertiary amino functions formed in the polymerization optionally to be protonated or quaternized after the polymerization in a separate step. The formation of quaternary ammonium units is preferred.

Preferred examples of —[N—N]— are, as described in more detail below: piperazine and imidazole, preferred diamine units —[N—$V^1$—N]— include, for example, polymethylenediamines, such as tetramethylhexamethylenediamine, α,ω-diamino-terminated polyethers, such as, for example, Jeffamines, etc.

Preferred diamine units —[N—$V^*$—$Z^2$—$V^*$—N]— include, for example, reaction products of α,ω-dihydrogenpolydialkylsiloxane with allylamines.

Preferred examples of —[N]— are, as described in more detail below, for example, dimethylamine.

The use of diamines —[N—N]— is preferred per se.

Preferred —[$V^1$] monomers include, for example, epichlorohydrin, bischloroalkyl esters, bisepoxides or bisacrylates. Mixtures of said —[$V^1$]— monomers, such as, for example, mixtures of epichlorohydrin, bischloroalkyl esters or bisepoxides, can preferably also be reacted.

Preferred —[$V^2$]— monomers are monomers of the formula [$V^*$—$Z^2$_$V^*$]—, wherein $Z^2$ is as defined above and —[$V^*$] is a functionalized group corresponding to the repeating unit $V^*$. Preferred —[$V^2$]— monomers for the formation of the $V^2$ repeating units are in particular α,ω-diepoxy-terminated polydialkylsiloxanes.

Variant b) can be carried out both with diamines, —[N—N]—, and with suitable monoamines —[N]— and may be represented schematically, for example, as follows:

Variant b1)

Step 1): 2—[N—N]— + —[$V^2$]— or —[$V^1$]— → —[N—N—$V^1$—N—N]— or —[N—N—$V^2$—N—N]—

Step 2.1.): —[N—N—$V^2$—N—N]— + —[$V^1$]— + —[N—N]— →,

Step 2.2): —[N—N—$V^1$—N—N]— + —[$V^2$]— + —[N—N]— →, the stoichiometric $V^2/V^1$ being established as desired.

Regarding the preferably used monomer units —[N—N]—, —[$V^1$]— and —[$V^2$]—, the statements made for step a) are applicable.

Variant a2)

Step 1): 2—[N]— + —[$V^2$]— or —[$V^1$]— → —[N—$V^1$—N]— or —[N_$V^2$—N]—

Step 2.1.): —[N—$V^2$—N]— + —[$V^1$]— + —[N]— →,

Step 2.2): —[N—$V^1$—N]— + —[$V^2$]— + —[N]— →, this variant, as mentioned above, being capable of being carried out only with primary or secondary monoamines, and the statements made for step a) being applicable with regard to the preferably used monomer units —[N]—, —[$V^1$]— and —[$V^2$]—.

Variant c) can be represented schematically, for example, as follows:

Variant c1)

Step 1): x+1—[N—N]— +x—[$V^1$]— → —[N—N—($V^1$—N—N)$_x$]—

Step 2): —[N—N—($V^1$—N—N)$_x$]— + —[$V^2$]— →, the statements made for step a) being applicable with regard to the preferably used monomer units —[N—N]—, —[V¹]— and —[V²]—.

Variant c2)
Step 1): 1+x—[N]—+x—[V¹]—→—[N—(V¹N)$_x$]—
Step 2): —[N—(V¹—N)$_x$]—+—[V²]—→ the statements made for step a) being applicable with regard to the preferably used monomer units —[N]—, —[V¹]— and —[V²]—.

Variant d) may be schematically represented, for example, as follows:
Variant d1)
Step 1): 1+x—[V¹]—+x—[N—N]—→—[V¹-(N—N—V¹)$_x$]—
Step 2): —[V¹-(N—N—V¹)$_x$]—+—[V²]—+—[N]— or —[N—N]—→ the statements made for step a) being applicable with regard to the preferably used monomer units —[N—N]—, —[V¹]— and —[V²]—.

Variant d2)
Step 1): 1+x—[V¹]—+x—[N]—→—[V¹-(N—V¹)$_x$]
Step 2): —[V¹-(N—V¹)$_x$]—+—[V²]—+—[N]— or —[N—N]—→ the statements made for step a) being applicable with regard to the preferably used monomer units —[N]—, —[N—N]—, —[V¹]— and —[V²]—.

For all variants represented schematically above, it is also true that mixtures of monoamines —[N]— and diamines —[N—N]— can be used.

Particularly preferably, the functional groups of the difunctional compounds capable of reacting with amino functions are selected from the group consisting of epoxy groups and haloalkyl groups.

Preferred as a starting point for the syntheses of the polysiloxane copolymers of the formulae (VII) and (VII') according to the invention, which are used as component a1), are α,ω Si—H functionalized siloxanes of the general structure

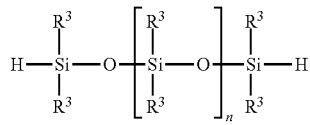

R³ having the abovementioned meaning and n, depending on the desired repeating unit V¹ or V², being $n_2$ or $n_1$, which are as defined above. If they are not commercially available, these siloxanes can be prepared by known processes, for example by equilibration (Silicone, Chemie und Technologie [Silicones, Chemistry and Technology], Vulkan-Verlag, Essen 1989, pages 82-84).

The precursors of the structural elements V* and Q can be prepared, for example, by two routes.

Firstly, it is possible first to bind unsaturated structures carrying tertiary amino functions, for example N,N-dimethylallylamine, directly to the siloxane in the α,ω-position by hydrosilylation. The process is generally known (B. Marciniec, Comprehensive Handbook on Hydrosilylation, Pergamon Press, Oxford 1992, pages 122-124).

Secondly, it is preferable first to produce reactive α,ω-functionalized intermediates by hydrosilylation, which intermediate can be converted subsequently into α,ω-ditertiary amino structures or directly into the quaternary ammonium structures according to the invention. Suitable starting substances for producing the reactive intermediates are, for example, halogenated alkenes or alkines, especially allyl chloride, allyl bromide, chloropropine and chlorobutine, unsaturated halocarboxylic esters, especially allyl chloroacetate, propargyl chloroacetate, allyl 3-chloropropionate and propargyl 3-chloropropionate, and epoxy-functional alkenes, for example vinylcyclohexene oxide and allyl glycidyl ether. The general procedure for hydrosilylations with members of said groups of substances is likewise known (B. Marciniec, Comprehensive Handbook on Hydrosilylation, Pergamon Press, Oxford 1992, pages 116-121, 127-130, 134-137, 151-155).

In a subsequent step, the reactive intermediates can then be reacted with compounds carrying secondary amino functions. Suitable members are N,N-dialkylamines, for example dimethylamine, diethylamine, dibutylamine, diethanolamine and N-methylglucamine, cyclic secondary amines, for example morpholine and piperidine, aminoamides carrying secondary amino functions, for example the reaction products of diethylenetriamine or dipropylenetriamine with lactones, such as γ-butyrolactone, gluconic acid δ-lactone and glucopyranosylarabonic acid lactone (DE-OS (German Published Specification) 43 18 536, examples 11a, 12a, 13a), or secondary-tertiary diamines, such as, for example, N-methylpiperazine. It is especially preferable to use corresponding imidazole or pyrazole derivatives, especially imidazole and pyrazole, for introducing tertiary amino functions.

Particularly suitable partners for the epoxide derivatives preferably used in an embodiment are said secondary-tertiary diamines, and also imidazole and pyrazole. In this way, the alkylations can be conducted regioselectively and without additional effort at the nitrogen atoms carrying hydrogen atoms.

To ensure quantitative conversion of the reactive groups into tertiary amino structures, the amines are used in a ratio of 1≦Σ secondary amino groups: reactive groups≦10, preferably from 1 to 3, especially from 1 to 2, very especially 1. Excess amounts of amine may have to be removed.

The binding of the α,ω-ditertiary aminosiloxanes described above to monomer units —[V¹]— corresponding to V¹ or to a prepolymer unit —[V¹-(Q-V¹)$_x$]— leads to the formation of further more highly alkylated amino units or quaternary ammonium units and can in turn be effected by two advantageous routes.

First, it is preferable separately to produce a strongly hydrophilic, polyquaternary, difunctional precondensate —[V¹-(Q-V¹)$_x$]—, which is combined with the α,ω-ditertiary aminosiloxanes at a suitable time and reacts to give polyaminosiloxane or polyquaternary siloxane copolymers.

The preparation of highly charged, difunctional prepolymers of different chain length —[V¹-(Q-V¹)$_x$]— is described by way of example in WO 99/14300 (examples 1 to 7, table 11). Depending on the molar ratio of V¹ and the amine on which Q is based, either a prepolymer terminated by amino groups according to its nature or a prepolymer terminated by other reactive groups can be produced.

In the case of the binding of a prepolymer —[N—(V¹—N)$_x$]— terminated by amino groups to the amine function of an α,ω-ditertiary aminosiloxane structure, for example, an alkylating or quaternizing difunctional monomer —[V¹]— corresponding to the repeating unit V¹ is selected, for example, from bisepoxides, epichlorohydrin and bishaloalkyl compounds can be used. There is no need to mention that different groups V¹ may result in the prepolymer and in the linker between prepolymer and α,ω-ditertiary aminosiloxane structure.

In the case of a prepolymer terminated by reactive groups, such as —[$V^1$-(Q-$V^1$)$_x$]—, direct binding to the amine function of the α,ω-ditertiary aminosiloxane structure without further linkers can be effected, so that an excess of the component producing $V^1$ was already used in the prepolymer synthesis.

As an alternative to the separate preparation of a precondensate —[$V^1$-(Q-$V^1$)$_x$]—, the synthesis of highly charged blocks can be effected in parallel with the incorporation into the copolymer. This means that the α,ω-ditertiary aminosiloxane is initially introduced together with the initiator components for the synthesis of —[$V^1$-(Q-$V^1$)$_x$]— for example, —[$V^1$]— and mono- or diamines of the abovementioned meaning —[N]— and/or —[N—N]— and is reacted.

Finally, it is possible to meter the α,ω-ditertiary aminosiloxane having a long-chain siloxane unit $Z^2$ or short-chain siloxane unit $Z^1$ or the α,ω-difunctional siloxane —[N—V*—$Z^2$—V*—N]— or —[N—$V^1$—N]— stepwise into the initially introduced components for the synthesis of —[$V^1$-(Q-$V^1$)$_x$]— over a period, or conversely to add these components stepwise to the α,ω-ditertiary aminosiloxane or α,ω-difunctional siloxane.

Prior provision of prepolymers terminated by amino groups, such as, for example, —[N—($V^1$)—N]$_x$—, opens up the possibility of carrying out the copolymer formation directly with suitable reactive intermediates, for example epoxy derivatives.

It is likewise preferable initially to introduce the reactive intermediates and initiator components for the synthesis of —[$V^1$-(Q-$V^1$)$_x$]— together and then to react them.

Finally, it is possible to meter the reactive intermediates stepwise into the initially introduced components for the synthesis of —[$V^1$-(Q-$V^1$)$_x$]— over a period, or conversely to add these components stepwise to the reactive intermediate.

Regardless of the choice of one of the reaction routes described above and of the closely related question as to whether amino units terminate the siloxane first or the prepolymer, the overall stoichiometry is chosen so that the sum of the amino functions and of the groups capable of reacting with them is about 1:1.

Within the scope of the invention, it is possible to depart from this preferred overall stoichiometry. However, products which no longer have the intended length of the highly charged, hydrophilic block —[$V^1$-(Q-$V^1$)$_x$]— and additionally leave behind an excess of unreacted initiator component are then obtained.

In addition to the overall stoichiometry of the reaction which is discussed above, the choice of the component(s) forming the repeating unit $V^1$ is of considerable importance for the property profile of the products.

Suitable difunctional monomers —[$V^1$]— on which the repeating units $V^1$ are based are, for example, the halocarboxylic esters of the polyalkylene oxide diols. Preferred starting materials for the synthesis thereof are low molecular weight, oligomeric and polymeric alkylene oxides of the general composition

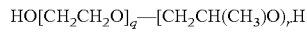

q and r having the abovementioned meanings, and the units being random or block-like. Preferred members with regard to alkylene oxide blocks are ethylene glycol, diethylene glycol, triethylene glycol, tetraethylene glycol, the oligoethylene glycols having molecular weights of from 200 to 10 000 g/mol, especially from 300 to 800, and 1,2-propylene glycol, 1,3-propylene glycol and dipropylene glycol.

The esterification of the alkylene oxides is effected in a manner known per se (Organikum, Organisch-chemisches Grundpraktikum [Fundamentals of practical organic chemistry], 17th edition VEB Deutscher Verlag der Wissenschaften, Berlin 1988, pages 402-408) by reaction with $C_2$- to $C_4$-halocarboxylic acids or the anhydrides or acid chlorides thereof. The acid chlorides of chloroacetic acid and 3-chloropropionic acid are preferably used and the reaction is carried out in the absence of solvents.

In an analogous manner, alkanediols, alkenediols and alkinediols can be converted into the corresponding reactive ester derivatives. Exemplary alcohols are 1,4-butanediol, 1,6-hexanediol, 1,4-but(-2-)enol and 1,4-but(-2-)inol.

The introduction of alkylene, alkenylene, alkinylene and aryl units is preferably effected starting from the corresponding halides, especially chlorides and bromides. Exemplary members are 1,6-dichlorohexane, 1,4-dichlorobut(-2-)ene, 1,4-dichlorobut(-2-)ine and 1,4-bis(chloromethyl)benzene.

Polyalkylene oxide units can likewise be introduced via the α,ω-dihalogen compounds. These are obtainable from the oligomeric and polymeric alkylene oxides of the general composition

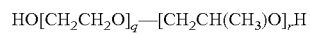

q and r having the abovementioned meanings, for example by chlorination of the hydroxyl groups with $SOCl_2$ (Organikum, Organisch-chemisches Grundpraktikum [Fundamentals of practical organic chemistry], 17th edition, VEB Deutscher Verlag der Wissenschaften, Berlin 1988, pages 189-190).

Mono-, di- or polyhydroxy functional units as group $V^1$ can be introduced starting from the epoxide derivatives.

Commercial examples are 1-chloro-2,3-epoxypropane, glycerol 1,3-bisglycidyl ether and diethylene glycol diglycidyl ether and neopentylglycol diglycidyl ether.

If they are not commercially available, the desired diepoxides can be synthesized, for example by reaction of the corresponding diols with 1-chloro-2,3-epoxypropane under alkaline conditions.

It is within the scope of the invention to introduce siloxane chains $Z^1$ into the structure of $V^1$. This gives rise, inter alia, to the possibility of using siloxane chains of different lengths for the synthesis of the total molecule. A preferred variant comprises incorporating siloxane chains $Z^1$ of the chain length range $n_2$=0 to 19, preferably 0 to 15, particularly preferably 0 to 10, especially 0 to 5, more especially 0, into $V^1$. Suitable starting materials for the incorporation are, for example, the corresponding α,ω-diepoxides or α,ω-di(monohalocarboxylic acid) ester structures.

In the reaction of epoxides with primary, secondary or tertiary amines, it should be noted that one mole of H+ per mole of epoxide/tertiary amine is to be added for alkylations of tertiary amino groups.

The choice of suitable amines as starting components for the formation of Q in the repeating unit —[$V^1$-(Q-$V^1$)$_x$]— likewise determines the molecular structure to a high degree. The use of ditertiary amines (corresponding to —[N—N]—), for example N,N,N',N'-tetramethylethylenediamine, N,N,N',N'-tetramethyltetramethylenediamine, N,N,N',N'-tetramethylhexamethylenediamine, N,N'-dimethylpiperazine, leads to products in which each nitrogen atom of the repeating unit is quaternized.

The use of secondary-tertiary diamines, for example N-methylpiperazine, opens up the route to repeating units —[$V^1$-(Q-$V^1$)$_x$]—, in which tertiary and quaternary amine or ammonium structures are present in the ratio 1:1. Partial or complete subsequent quaternization of remaining tertiary amino structures is a preferred variant for establishing a desired high density of the quaternary ammonium group. The corresponding aromatic amines imidazole and pyrazole lead to products having a delocalized charge.

With the use of primary-tertiary diamines, for example N,N-dimethylpropylenediamine and 1-(3-aminopropyl)imidazole, especially in combination with diepoxides, it is possible to synthesize comb-like structures for which the degree of quaternization can be chosen during a final alkylation. In principle, the alkylations can also be adjusted to obtain degrees of quaternization of on average less than one quaternary ammonium group per repeating unit —[$V^1$-(Q-$V^1$)$_x$]—. However, it is preferable to quaternize at least one nitrogen atom per repeating unit.

Starting from disecondary amines, for example piperazine, N,N'-bis(2-hydroxyethyl)hexamethylenediamine, N,N'-bis(2-hydroxypropyl)hexamethylenediamine, it is also possible in principle to synthesize repeating units —[$V^1$-(Q-$V^1$)$_x$]- having an average content of less than one quaternary ammonium group. Here, the disecondary amines initially give siloxane copolymers amino-modified so as to be polytertiary, or prepolymers which can be partly or completely quaternized in a final reaction to give —[$V^1$-(Q-$V^1$)$_x$]—. In this variant, too, however, it is preferable to quaternize at least one nitrogen atom per repeating unit.

Suitable quaternizing agents are the generally known groups of substances, such as alkyl halides, halocarboxylic esters, epoxide derivatives in the presence of $H^+$ and dialkyl sulfates, especially dimethyl sulfate.

The preparation of disecondary amines which are not commercially available is effected in a preferred embodiment starting from the corresponding diprimary amines, for example hexamethylenediamine, by alkylation with epoxides, such as, for example, ethylene oxide, propylene oxide, isopropyl glycidyl ether, utilizing the different reaction rates of primary and secondary amines.

It had already been stated that, within the scope of the invention, there is a possibility of introducing siloxane chains $Z^1$ into the structure of $V^1$. The reactive intermediates α,ω-diepoxides and α,ω-di(monohalocarboxylic acid) ester were mentioned by way of example as suitable starting materials.

Suitable anions $A^-$ utilizing the positive charges resulting from the ammonium groups are preferably the ions formed during the quaternization, such as halide ions, especially chloride and bromide, alkylsulfates, especially methosulfate, carboxylates, especially acetate, propionate, octanoate, decanoate, dodecanoate, tetradecanoate, hexadecanoate or octadecanoate, oleate and sulfonates, especially toluenesulfonate. However, other anions can also be introduced by ion exchange. Organic anions, such as polyethercarboxylates and polyethersulfates, may be mentioned by way of example.

The quaternization reactions are preferably carried out in water, polar organic solvents or mixtures of said two components. For example, alcohols, especially methanol, ethanol, isopropanol and n-butanol, glycols, such as ethylene glycol, diethylene glycol, triethylene glycol, the methyl, ethyl and butyl ethers of said glycols, 1,2-propylene glycol and 1,3-propylene glycol, ketones, such as acetone and methyl ethyl ketone, esters, such as ethyl acetate, butyl acetate and 2-ethylhexyl acetate, ethers, such as tetrahydrofuran, and nitro compounds, such as nitromethane, are suitable. The choice of the solvent depends substantially on the solubility of the reactant, the intended reaction temperature and any reactivity present which interferes with the reaction.

The reactions are carried out in the range from 20° C. to 130° C., preferably from 40° C. to 100° C.

In order to avoid the formation of gel-like, linear polyorganosiloxane polymers which are not completely soluble, an upper limit is expediently imposed on the molecular weight.

The molecular weight is limited by the endstopping resulting during the reaction between epoxide and water or alcohol which may be present in the reaction system, or alternatively by the additional use of tertiary amines, such as trialkylamines, or monofunctional compounds reactive toward amino groups.

This means that, in addition to the terminal groups naturally resulting from the reaction of the monomeric starting materials, the polyorganosiloxane polymers may also have terminal ammonium, amino, ether or hydroxyl groups resulting from monofunctional chain terminators, such as trialkylamines, etc. and, for example, resulting therefrom. All cases of endstopping should be covered by the abovementioned definition -Q-$R^E$ and/or —V—$R^E$, wherein Q, V and $R^E$ is as defined above.

The polysiloxanes of the general formula (VII) which are used according to the invention as component a1) may also contain branching units $V^3$. $V^3$ is a trivalent or higher-valent, straight-chain, cyclic or branched, saturated, unsaturated or aromatic hydrocarbon radical having up to 1000 carbon atoms, which optionally may contain one or more groups selected from —O—, —CONH—, —CONR$^2$—, wherein R$^2$ is as defined above, —C(O)—, —C(S)—, —$Z^1$—, which is as defined above, —$Z^2$—, which is as defined above, and $Z^3$, wherein $Z^3$ is a trivalent or higher-valent organopolysiloxane unit. The branching unit $V^3$ may be silicone-free. Examples thereof include:

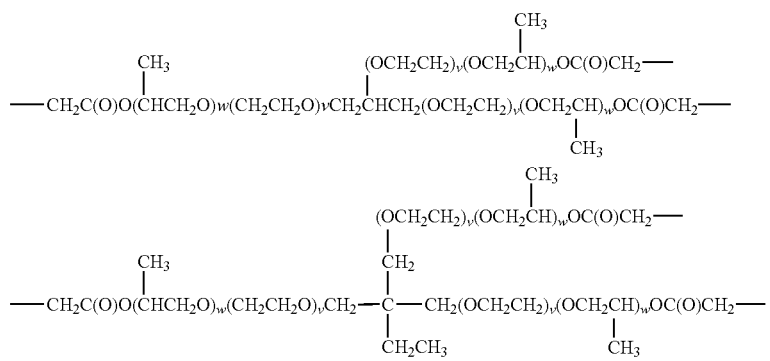

-continued
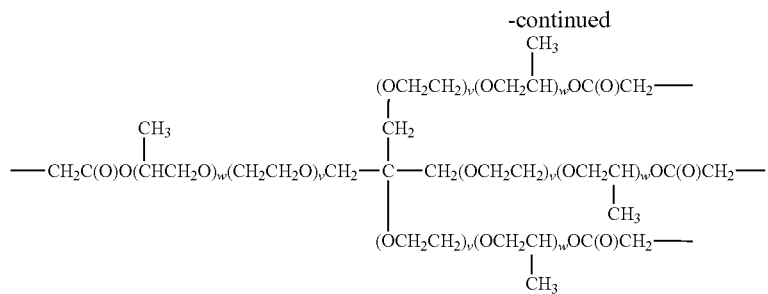
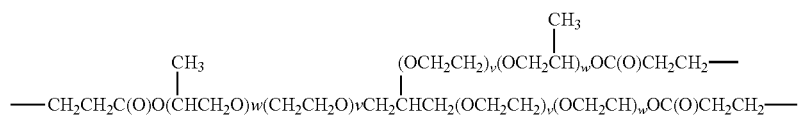
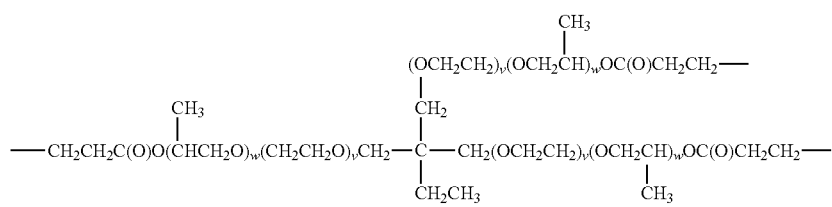
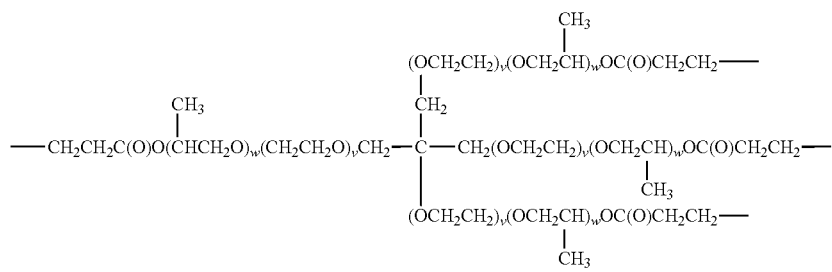
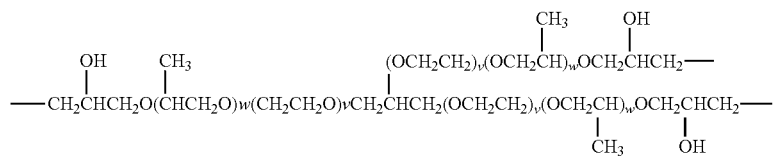
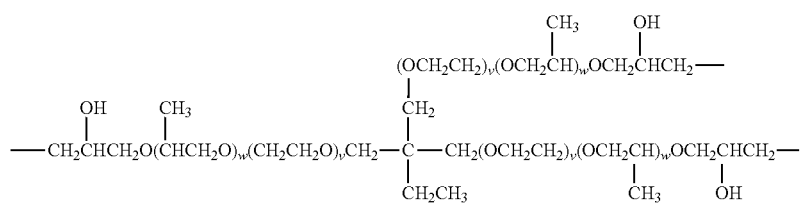

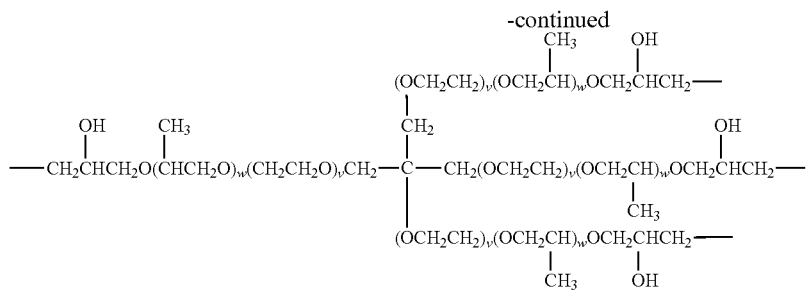

where v+w≧0.

The branching unit $V^3$ may contain a trivalent or higher-valent organopolysiloxane unit, such as, for example:

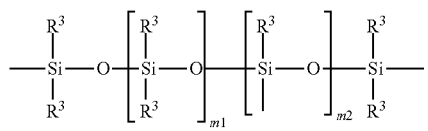

wherein $R^3$ is as defined above, m1=0 to 1000 and m2≧1,

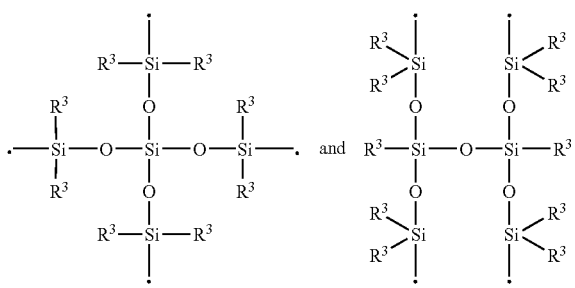

wherein $R^3$ in each case is as defined above.

An example of a $Z^3$-containing branching unit $V^3$ is, for example:

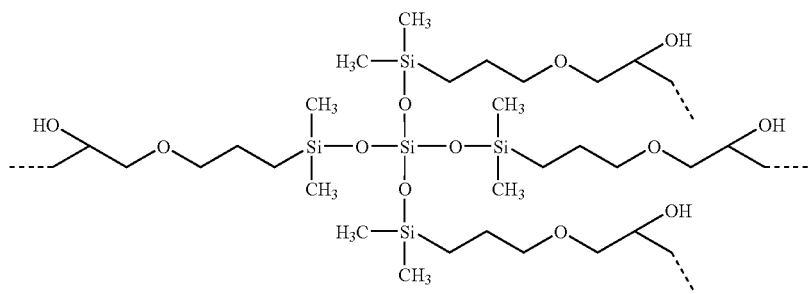

The polyamino- and/or polyammonium/polysiloxane compounds a1) used may be solid or liquid at 25° C. Where they are liquid at 25° C., the viscosities of the said polysiloxanes a1) are preferably from 500 to 50 000 000 mPa·s at 25° C., preferably from 1000 to 2 500 000 mPa·s at 25° C. and at a shear rate gradient of $D=1s^{-1}$. They may have melting points of up to 250° C. but are water-soluble or water-dispersible. Their solubility is preferably more than 1 g/l at 25° C.

The abovementioned amino- and/or ammonium-polysiloxane compounds a1) are used according to the invention together with the amino- and/or ammonium-polysiloxane compound a2). The amino- and/or ammonium-polysiloxane compound a1) can, however, also be used without the amino- and/or ammonium-polysiloxane compound a2), optionally alone or in compositions with further constituents for the treatment, in particular surface treatment, of substrates, such as, in particular, fiber substrates or fiber-like substrates, such as, for example, paper, cellulose, wool, hair, etc., said use being within the scope of the present disclosure. However, the combined use of the components a1) and a2) is within the scope of the invention.

The amino- and/or ammonium-polysiloxane compound a1) is preferably a copolymer compound which has amino and/or ammonium repeating units and polysiloxane repeating units in the polymer main chain. The amino units expediently contain secondary and/or tertiary nitrogen atoms (2 or 3 organic radicals on the neutral nitrogen atom). The ammonium units contain secondary, tertiary and/or quaternary positively charged nitrogen atoms (2, 3 or 4 organic radicals on the nitrogen). As explained above, heterocyclic radicals incorporated into the polymer chain via two nitrogen atoms can also serve as amino and/or ammonium repeating units. Typically, there are no free trialkylsilyl-endstopped organosiloxane chains in the amino- and/or ammonium-polysiloxane compound a1).

Owing to the binding of the groups $V^{Si2}$ containing polydiorganosiloxane groups to the groups Q by means of the structural elements of the formulae (II) and (III), component a2) generally comprises polysiloxane compounds which contain amino and/or ammonium groups in the side groups of the polyorganosiloxane main chain. This means that the amino and/or ammonium groups are not present in the main chain comprising polyorganosiloxane repeating units.

The difference compared with the component a1) can be illustrated as follows with respect to the preferred linear embodiment of the component a1): Linear polyamino- and/or polyammonium-polysiloxane compound a1):

—Amino/ammonium-[polyorganosiloxane-amino/ammonium-]polyorganosiloxane—

Amino- and/or ammonium-polysiloxane Compound a2):

-Polyorganosiloxane chain-
            |
            Amino/ammonium-containing radical-.

The polyamino- and/or polyammonium-polysiloxane compound a1), too, can in principle have branches owing to the presence of the groups $V^3$, but they must have the structural unit of the formula (I) which the component a2) does not have.

In the composition according to the invention, the components a1) and a2) serve as a substantivity-imparting component, in particular owing to the presence of quaternary, i.e. tetraorgano-substituted, ammonium groups.

The amino- and/or ammonium-polysiloxane compound a2) contained in the composition according to the invention contains at least one amino or ammonium group Q and at least one organic radical V, with the proviso that at least one organic radical V is an organic radical $V^{Si2}$ containing a polydiorganosiloxane group, wherein the binding of the group Q to the group $V^{Si2}$ is effected by the structural element selected from the formulae (II) and (III)

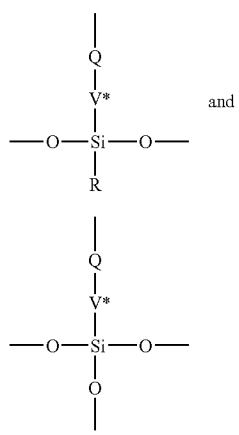

wherein V* is in each case a divalent organic radical which in each case is bonded via a carbon atom to the silicon atom of the organosiloxane radical and to the nitrogen atom of the amino and ammonium group Q, R is a monovalent organic radical, with the proviso that the amino- and/or ammonium-polysiloxane compound a2) has no structural element of the formula (I), and with the proviso that the group Q does not bind to a carbonyl carbon atom.

The binding of the group Q to the group $V^{Si2}$ is preferably effected by the structural unit selected from the formulae (IIa) and (IIIa)

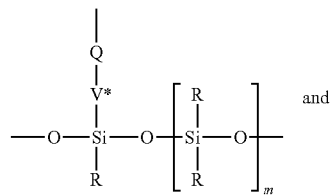

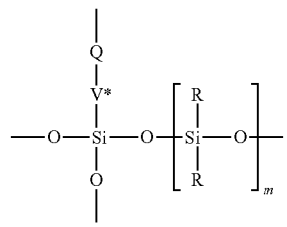

wherein V* in each case is a divalent organic radical which in each case is bonded via a carbon atom to the silicon atom of the organosiloxane radical and to the nitrogen atom of the amino or ammonium group Q, R is a monovalent organic radical and m in each case is the mean degree of polymerization and is in each case from 0 to 2000.

Regarding the preferred meanings of Q, R, V*, reference may be made to the above explanations for component a1).

One or more a amino- and/or ammonium-polysiloxane compounds a2) may be used as component a2). These contain, as described above, amino or ammonium groups which are present as side groups of the polydiorganosiloxane chains by means of the structural elements of the formulae (II) and (III) or preferably (IIa) and (IIIa). The amino- and/or ammonium-polysiloxane compounds a2) are preferably polysiloxanes carrying primary and/or secondary and/or tertiary amino groups in the side groups, wherein the amino groups are optionally protonated or quaternized, and which optionally may contain additional hydrophilic groups, such as, for example, polyether groups. Said amino or ammonium groups are bonded via carbon to the silicon of the siloxane skeleton. Said amino- and/or ammonium-polysiloxane compounds a2) are preferably polyalkylsiloxanes having aminoalkyl- or aminoarylsiloxane units. The aminoalkyl units may be both bonded to the difunctional, trifunctional or monofunctional terminal groups and part of other oxygen-containing side groups, in particular of polyether side groups.

The optionally present additional groups imparting hydrophilic properties are preferably those which are derived from polyalkylene oxides and saccharides.

Said aminopolysiloxanes are linear or branched polysiloxanes which are composed of silyloxy units which are selected from the group consisting of:

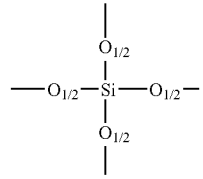

-continued

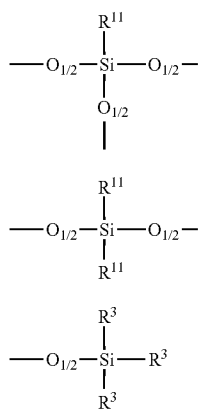

wherein $R^{11}$ is organic radicals and $R^3$ is as defined above, which in each case may be identical or different from one another, with the proviso that at least one of the radicals $R^{11}$ contains at least one nitrogen atom.

The substituents $R^{11}$ are preferably selected from the group consisting of:
straight-chain, cyclic or branched, saturated, unsaturated or aromatic hydrocarbon radical having up to 200 carbon atoms, which optionally may contain one or more groups selected from
—O—,
—NR²—, wherein R² is as defined above,

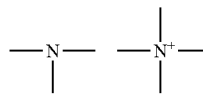

—C(O)— and —C(S)—,
and the radical may be optionally substituted by one or more substituents selected from hydroxyl, alkyl sulfate, dialkyl phosphonate, dialkyl phosphate and

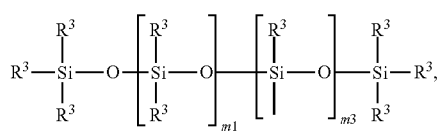

wherein $R^1$ and m1 are as defined above and $m3 \leqq 1$, hydroxyl,
a polyether radical having up to 20 000 carbon atoms, which optionally may carry one or more amino, mono- or dialkylamino, arylamino, alkyl sulfate, dialkyl phosphonate or dialkyl phosphate groups,
a saccharide-containing organic radical,
or two substituents $R^{11}$ comprising different silyloxy units together form a straight-chain, branched or cyclic alkanediyl radical having 2 to 12 carbon atoms between two silicon atoms, with the proviso that at least one substituent $R^{11}$ per molecule contains nitrogen, i.e. is a nitrogen-containing radical $R^{11}$. It must be at least a quaternizable nitrogen atom, in contrast to, for example, an amide nitrogen atom.
$R^{11}$ is preferably alkyl, in particular methyl.

Preferred radicals $R^{11}$ which have nitrogen are, for example:

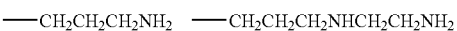

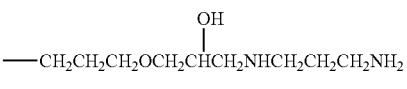

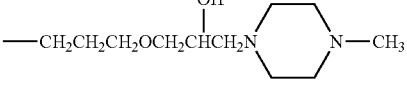

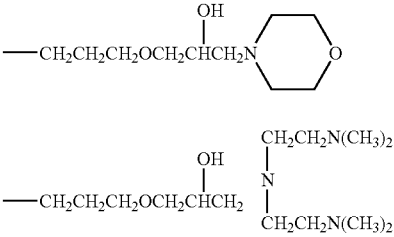

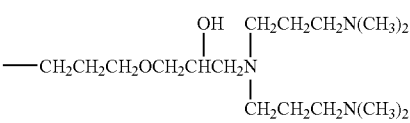

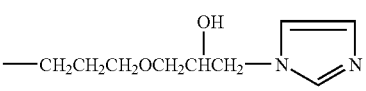

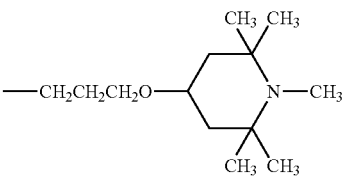

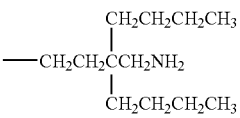

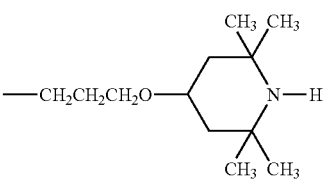

Further preferred amino- or ammonium-containing radicals $R^{11}$ are, for example:

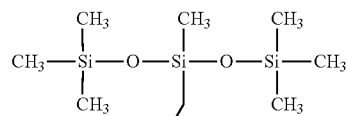

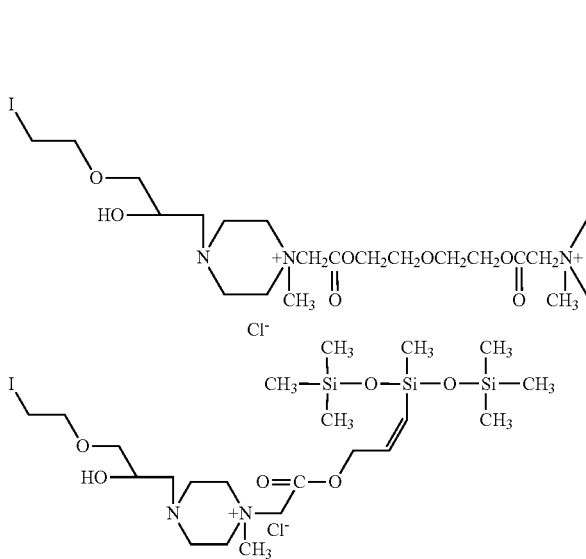

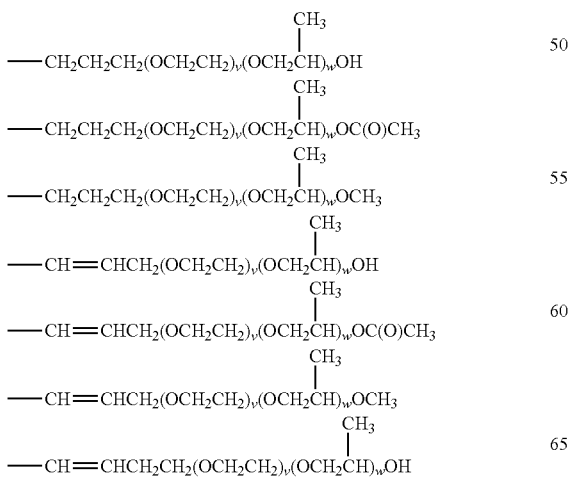

Corresponding aminopolysiloxanes having such radicals $R^{11}$ are disclosed in WO 02/10256, the disclosure of which forms part of the present Application.

The nitrogen-containing radical $R^{11}$ is preferably aminopropyl or aminoethyl-aminopropyl. Further preferred nitrogen-containing radical $R^{11}$ are formed from the reaction of glycidyloxypropylsiloxanes with mono- or dialkylamines. Preferred compounds as component a2) are therefore, for example, aminopolysiloxanes which originate from the reaction of epoxyalkylsiloxanes with ammonia or primary or secondary amines such as the stated ones obtained from the reaction of glycidyloxypropylsiloxanes with mono- or dialkylamines. Preferred alkoxy radicals for $R^{11}$ are methoxy, ethoxy, propoxy, isopropoxy, butoxy, hexyloxy and cyclohexyloxy.

Preferred polyether radicals having up to 20 000 carbon atoms for $R^{11}$, which optionally may carry one or more amino, mono- or dialkylamino or arylamino groups, include, for example:

—CH$_2$CH$_2$CH$_2$(OCH$_2$CH$_2$)$_v$(OCH$_2$CH(CH$_3$))$_w$OH

—CH$_2$CH$_2$CH$_2$(OCH$_2$CH$_2$)$_v$(OCH$_2$CH(CH$_3$))$_w$OC(O)CH$_3$

—CH$_2$CH$_2$CH$_2$(OCH$_2$CH$_2$)$_v$(OCH$_2$CH(CH$_3$))$_w$OCH$_3$

—CH═CHCH$_2$(OCH$_2$CH$_2$)$_v$(OCH$_2$CH(CH$_3$))$_w$OH

—CH═CHCH$_2$(OCH$_2$CH$_2$)$_v$(OCH$_2$CH(CH$_3$))$_w$OC(O)CH$_3$

—CH═CHCH$_2$(OCH$_2$CH$_2$)$_v$(OCH$_2$CH(CH$_3$))$_w$OCH$_3$

—CH═CHCH$_2$CH$_2$(OCH$_2$CH$_2$)$_v$(OCH$_2$CH(CH$_3$))$_w$OH

—CH═CHCH$_2$CH$_2$(OCH$_2$CH$_2$)$_v$(OCH$_2$CH(CH$_3$))$_w$OC(O)CH$_3$

—CH═CHCH$_2$CH$_2$(OCH$_2$CH$_2$)$_v$(OCH$_2$CH(CH$_3$))$_w$OCH$_3$

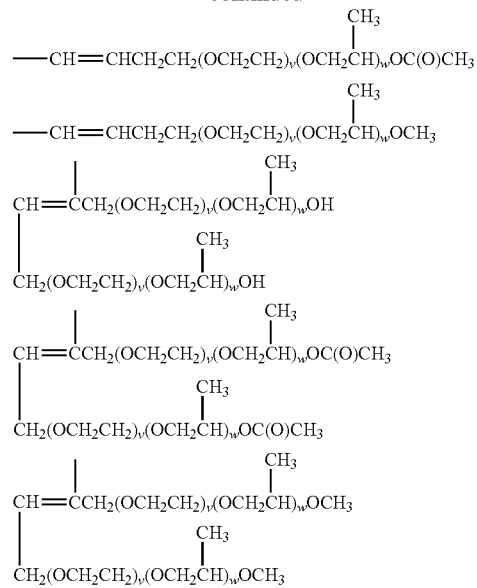

where $v+w \geq 1$.

Saccharide-containing organic radicals for $R^{11}$ are, for example:

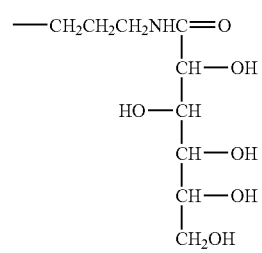

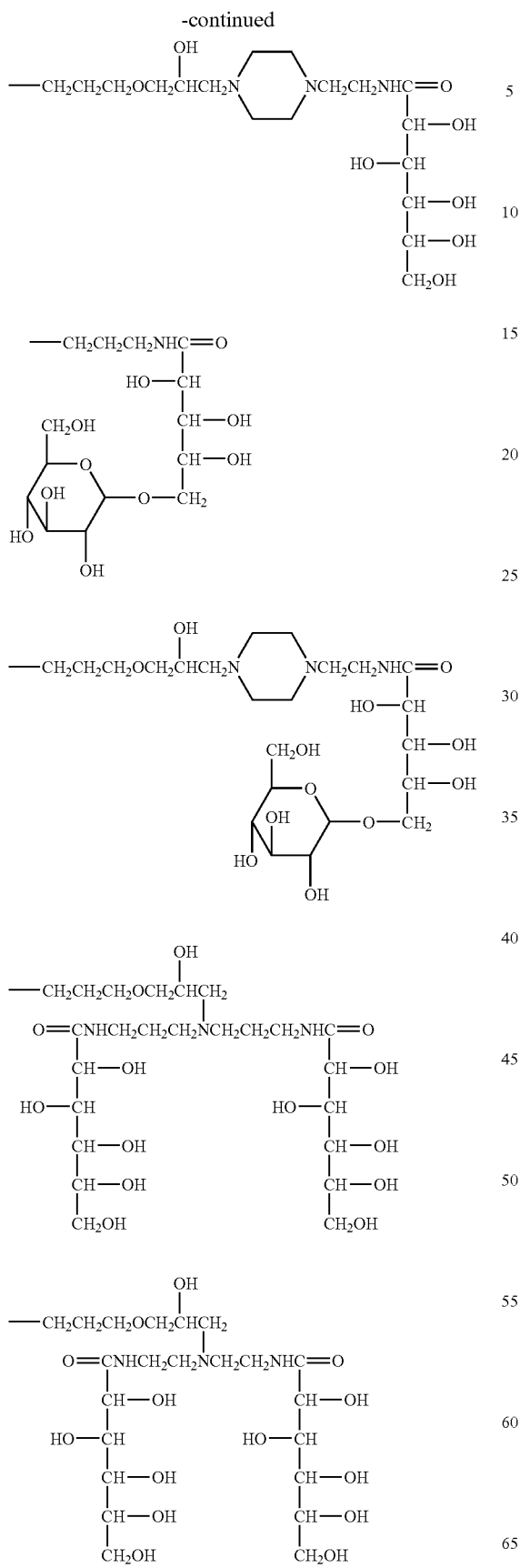

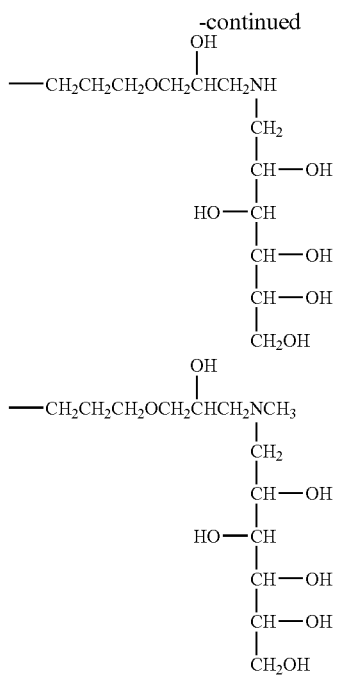

The preparation of such saccharide-containing polysiloxanes is described, for example, in DE 4 318 536 and DE 4 318 537.

The mean degree of polymerization of the polysiloxane moiety of the aminopolysiloxanes a2) used according to the invention, which is derived from Mn, is expediently from 1 to 3000, preferably from 200 to 1000.

The ratio of the nitrogen-free polyorganosiloxane units to the nitrogen-containing polyorganosiloxane units in the aminopolysiloxanes a2) used according to the invention is expediently from 1:1 to 500:1.

The ratio of the polyether- or polysaccharide-containing polyorganosiloxane units to the other polyorganosiloxane units may be from 0 to 1.

The typical nitrogen content of the aminopolysiloxanes a2) used according to the invention is, for example, from 0.005% by weight to 18% by weight, preferably from 0.02% by weight to 5% by weight, particularly preferably from 0.02% by weight to 1.5% by weight. By limiting the nitrogen content and/or by increasing the siloxane chain length, the hydrophilic character is preferably adjusted to be lower than that of the component a1). This measure is also cost-limiting for a2).

The aminopolysiloxanes a2) used may be solid or liquid at 25° C. Where they are liquid at 25° C., the viscosities of the aminopolysiloxanes a2) used according to the invention are preferably from 500 to 500 000 mPa·s at 25° C., preferably from 1000 to 25 000 mPa·s at 25° C. and at a shear rate gradient of D=1 s$^{-1}$.

They may have melting points of up to 250° C. but are water-soluble or water-dispersible. Their solubility is preferably more than 1 g/l at 25° C.

The above-described aminopolysiloxanes a2) used according to the invention are available, for example, as Wacker Finish® WR 1100 and General Electric® SF 1923.

Amino- and/or ammonium-polysiloxane compounds which can be used according to the invention as component a2) are also described, for example, in the patents U.S. Pat.

No. 5,098,979, U.S. Pat. No. 6,030,675, U.S. Pat. No. 6,054,020, U.S. Pat. No. 6,136,215, U.S. Pat. No. 6,432,270, U.S. Pat. No. 6,511,580, etc.

The amino groups in the amino- and/or ammonium-polysiloxane compounds a1) and a2) may be present in protonated form, i.e. the amino- and/or ammonium-polysiloxane compounds a1) and a2) are present as acid addition salts. The positive charges in the amino- and/or ammonium-polysiloxane compounds a1) and a2) which result from the ammonium groups are neutralized by organic or inorganic acid anions. For example, the following may be present as anions which neutralize the positive charges resulting from the ammonium groups: halide ions, especially chloride and bromide, alkylsulfates, especially methosulfate, carboxylates, especially acetate, propionate, octanoate, decanoate, dodecanoate, tetradecanoate, hexadecanoate and octadecanoate, oleate and sulfonates, especially toluenesulfonate. A suitable non-neutralizing anion for the quaternized compounds is also the $OH^-$ anion. By the use of ion exchange, it is also possible to introduce other anions. Organic anions, such as polyethercarboxylates and polyethersulfates, may be mentioned by way of example.

The optionally used component b), the silicone-free surfactants b), comprise one or more silicone-free, preferably cationic or nonionic surfactants. The preferred cationic surfactants are at least one constituent which is selected from unpolymerized, organic, quaternary ammonium compounds. They are preferably quaternary ammonium salts or amine salts containing hydrocarbon groups, it being possible for the hydrocarbon groups preferably to contain 8 to 28 carbon atoms.

Examples of component c) are compounds of the following formula:

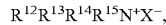

wherein $R^{12}$, $R^{13}$, $R^{14}$ and $R^{15}$, independently of one another, are selected from the group consisting of: $C_1$-$C_{28}$-alkyl, alkenyl, hydroxyalkyl, benzyl, alkylbenzyl, alkenylbenzyl, benzylalkyl and benzylalkenyl, and X is an anion. The hydrocarbon groups $R^{12}$, $R^{13}$, $R^{14}$ and $R^{15}$, independently of one another, may be polyalkoxylated, preferably polyethoxylated or polypropoxylated, preferably with groups of the general formula $(C_2H_4O)_yH$, wherein y=1 to 15, preferably 2 to 5. Not more than one of the groups $R^{12}$, $R^{13}$, $R^{14}$ and $R^{15}$ should be benzyl. Groups $R^{12}$, $R^{13}$, $R^{14}$ and $R^{15}$, independently of one another, may contain one or more, preferably two, ester (—[—O—C(O)—]; [—C(O)—O—]) and/or amido groups (—[CO—N($R^{12}$)—]; [—N($R^{12}$)—CO—]), wherein $R^{12}$ is as defined above. The anion X can be selected from halides, methosulfates, acetate and phosphate, preferably from halides and methosulfate. Further examples of component b) are tetraorgano-substituted quaternary ammonium compounds having one or two long-chain $C_8$ to $C_{28}$ hydrocarbon radicals and two or three short-chain $C_1$ to $C_6$ hydrocarbon radicals. The long-chain radicals are preferably $C_{12}$ to $C_{20}$ chains and for the short-chain radicals methyl, ethyl, propyl, butyl, hexyl, phenyl and hydroxyethyl, 2-hydroxypropyl. Preferred opposite ions are $Cl^-$, $Br^-$, $CH_3OSO_3^-$, $C_2H_5OSO_3^-$, $NO_3^-$, $HCOO^-$ and $CH_3COO^-$.

The following may be mentioned by way of example:
dodecyl-ethyl-dimethyl-ammonium bromide
didodecyl-dimethyl-ammonium bromide.

In the cationic surfactants which contain only one long-chain hydrocarbon group $R^{12}$, the chain length of the long-chain hydrocarbon group is preferably 12 to 15 carbon atoms, and the short-chain radicals $R^{13}$, $R^{14}$ and $R^{15}$ are preferably methyl and hydroxyethyl.

In the cationic surfactants which contain two, three or even four long-chain hydrocarbon groups, the chain length of the long-chain hydrocarbon groups is preferably 12 to 28 carbon atoms.

Preferred ester-containing surfactants have the formula:

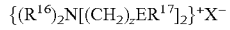

where $R^{16}$ is selected independently from $C_{1-4}$ alkyl, hydroxyalkyl or $C_{2-4}$ alkenyl; and wherein $R^{17}$ is selected independently from $C_8$-28 alkyl or alkenyl groups; E is an ester group, i.e. —OC(O)— or —C(O)O—, z is an integer from 0 to 8 and $X^-$ is as defined above. They contain two or three short-chain C1 to C6 hydrocarbon radicals. The one or two long alkyl radicals per molecule are derived from fatty acids having the lengths C8 to C26, preferably C10 to C20, especially C12 to C18. The fatty acids or the segments of said chain length ranges may be saturated fatty acids, unsaturated fatty acids, hydroxyl-substituted fatty acids or mixtures thereof. Examples of said acids are lauric acid, myristic acid, palmitic acid, stearic acid, oleic acid and ricinoleic acid. Further examples are tallow fatty acid and coconut fatty acid segments. The binding thereof to the quaternized nitrogen is preferably effected via oxyethyl, 2-oxypropyl or 1,2-dioxypropyl or oligooxyethylene spacers. The short-chain radicals are preferably methyl, ethyl, propyl, butyl, hexyl, phenyl and hydroxyethyl, 2-hydroxypropyl. Preferred opposite ions are $Cl^-$, $Br^-$, $CH_3OSO_3^-$, $C_2H_5OSO_3^-$, $NO_3^-$, $HCOO^-$ and $CH_3COO^-$.

The following may be mentioned by way of example:
(tallow fatty acid-oxyethyl)-trimethyl-ammonium methosulfate
(coconut fatty acid-pentaethoxy)-trimethyl-ammonium methosulfate
di(tallow fatty acid-oxyethyl)-dimethylammonium chloride
di(tallow fatty acid-oxyethyl)-hydroxyethyl-methyl-ammonium methosulfate
di(tallow fatty acid-2-oxypropyl)-dimethyl-ammonium methosulfate
1,2-ditallow fatty acid-oxy-3-trimethyl-propane-ammonium chloride A further type of preferred ester-containing cationic surfactants can be represented by the following formula:

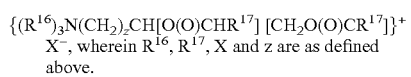

A further group of the cationic surfactants c) comprises those of the formula $R^{18}A(CH_2)_{2-4}NR^{19}R^{20}$, wherein $R^{18}$ is $C_6$-$C_{12}$ alkyl;

A is a divalent group which is selected from —NH—, —CONH—, —COO— or —O—, or A may be absent; $R^{19}$ and $R^{20}$ are selected independently from the group consisting of H, $C_1$-$C_{14}$ alkyl or $(CH_2$—$CH_2$—$O(R^{21}))$, wherein $R^{21}$ is H or methyl.

Particularly preferred surfactants of this type are decylamine, dodecylamine, $C_8$-$C_{12}$ bis(hydroxyethyl)amine, $C_8$-$C_{12}$ bis(hydroxypropyl)amine, $C_8$-$C_{12}$ amidopropyldimethylamine or salts thereof.

Further surfactants include: fatty acid amides of the formula $R^{22}C(O)N(R^{23})_2$, wherein $R^{22}$ is an alkyl group having 8 to 28 carbon atoms and $R^{23}$ is in each case a short-chain radical preferably selected from hydrogen, $C_1$-$C_6$ alkyl and hydroxyalkyl. $C_8$-$C_{28}$ N-alkylpolyhydroxy-fatty acid amides can also be used. Typical examples include $C_{12}$-$C_{18}$ N-methylglucamide (cf. WO 92/06154). Other sugar derivatives include, for example, $C_8$-$C_{28}$ N-(3-methoxypropyl)glucamide. These likewise have two or three short-chain $C_1$ to $C_6$ hydrocarbon radicals. The one or two long alkyl radicals per molecule are derived from fatty acids having the lengths C8 to C26, preferably C10 to C20, especially C12 to C18. The fatty acids or the segments of said chain length ranges can likewise be saturated fatty acids, unsaturated fatty acids, hydroxyl-substituted fatty acids or mixtures thereof. Examples of said acids are lauric acid, myristic acid, palmitic acid, stearic acid, oleic acid and ricinoleic acid. Further examples are tallow fatty acid and coconut fatty acid segments. The binding thereof to the quaternized nitrogen is preferably effected via amidoethyl or 3-amidopropyl spacers. The short-chain radicals are preferably methyl, ethyl, propyl, butyl, hexyl, phenyl and hydroxyethyl, 2-hydroxypropyl. Alternatively, they may be cyclic radicals, such as imidazolinium radicals, in which optionally fatty alkyl substituents are additionally incorporated. Preferred opposite ions are $Cl^-$, $Br^-$, $CH_3OSO_3^-$, $C_2H_5OSO_3^-$, $NO_3^-$, $HCOO^-$ and $CH_3COO^-$.

The following may be mentioned by way of example:
(undecylenoic acid-amidopropyl)-trimethyl-ammonium methosulfate
(ricinoleic acid-amidopropyl)-trimethyl-ammonium methosulfate
1-methyl-1-tallow fatty acid-amidoethyl-2-tallow fatty alkyl-imidazolinium methosulfate
1-methyl-1-oleylamidoethyl-2-oleyl-imidazolinium methosulfate
1,1-ethylene-bis-(1-methyl-2-tallow fatty alkyl-imidazolinium) methosulfate.

In addition to the quaternary ammonium compounds, amine salts may also be used. These are salts of primary, secondary or tertiary amines with inorganic or organic acids.

In these amine salts, the nitrogen is substituted by one or two long-chain C8 to C28 hydrocarbon radicals, one to three hydrogen atoms and optionally one or two short-chain C1 to C6 hydrocarbon radicals. The one or two long alkyl radicals per molecule are derived, for example, from fatty amines or fatty acids having lengths C8 to C26, preferably C10 to C20, especially C12 to C18. Preferred opposite ions are $Cl^-$, $Br^-$, $CH_3OSO_3^-$, $C_2H_5OSO_3^-$, $NO_3^-$, $HCOO^-$ and $CH_3COO^-$.

Fatty amines used may be ethoxylated in order to increase the hydrophilic character. An example is the ethoxylated stearylamine derivative $CH_3(CH_2)_{17}N^+H[(CH_2CH_2O)_5H]_2$ $Cl^-$.

The fatty acids or the segments of the said chain length ranges may be the saturated fatty acids, unsaturated fatty acids, hydroxy-substituted fatty acids or mixtures thereof already described. Examples of said acids are lauric acid, myristic acid, palmitic acid, stearic acid, oleic acid and ricinoleic acid. Further examples are tallow fatty acid and coconut fatty acid segments. The binding thereof to the amine salt nitrogen is effected in the case of esters preferably via oxyethyl, 2-oxypropyl and 1,2-dioxypropyl spacers and, in the case of amides preferably by amidoethyl and 3-amidopropyl spacers. The short-chain radicals are preferably methyl, ethyl, propyl, butyl, hexyl, phenyl and hydroxyethyl, 2-hydroxypropyl. Preferred opposite ions are $Cl^-$, $Br^-$, $CH_3OSO_3^-$, $C_2H_5OSO_3^-$, $NO_3^-$, $HCOO^-$ and $CH_3COO^-$.

The following may be mentioned by way of example:
stearic acid triethanolamine derivatives:
$CH_3(CH_2)_{16}C(O)OCH_2CH_2N^+(CH_2CHOH)_2$ $Cl^-$
stearic acid amide derivative $CH_3(CH_2)_{16}CONHCH_2CH_2N^+$ $H_2CH_2CH_2N^+H_3$ $2Cl^-$
stearic acid amide derivative $CH_3(CH_2)_{16}CONHCH_2CH_2N^+$ $H_2CH_2CH_2OH$ $Cl^-$
palmitic acid amide derivative $CH_3(CH_2)_{14}$ $CONHCH_2CH_2CH_2N^+H(CH_3)_2$ $Cl^-$.

The amount of the optionally used component b), based on the total amount of the formulation, is from 0 to 30% by weight, preferably from 0 to 10% by weight. If the component b) is present in the formulation, the amount is preferably from 0.01% by weight to 15% by weight, more preferably from 1 to 10% by weight.

The component b) in the formulations according to the invention has in particular the function of improving the emulsifiability of the component a2) and optionally of increasing the substantivity.

In a preferred embodiment of the invention, the polyorganosiloxane composition is characterized in that the silicone-free surfactant as component b) is at least one constituent which is selected from unpolymerized, organic, quaternary ammonium compounds.

In another preferred embodiment of the invention, the polyorganosiloxane composition is characterized in that the silicone-free surfactant as component b) is selected from nonionic emulsifiers. Examples of nonionic surfactants include: alkoxylated alcohols, ethylene oxide (EO)-propylene oxide (PO) block polymers, polyhydroxy-fatty acid amides, alkylpolysaccharides and the like. Such usually liquid surfactants preferably include those having an HLB in the range from 3 to 20. The nonionic surfactants are preferably alcohol alkoxylate surfactants. Alkoxylated fatty alcohols which contain about 2 to 20 ethylene oxide units per molecule, preferably about 3 to 15 ethylene oxide units per molecule, are also preferred. Examples of liquid fatty alcohol alkoxylates which are useful in the nonaqueous liquid phase of the composition or can be used as such include those which are prepared from alcohols having 12 to 15 carbon atoms and which contain about 7 moles of ethylene oxide. Such materials are sold commercially under the trade names Neodol 25-7 and Neodol 23-6.5 by Shell Chemical Company. Alcohol ethoxylates of this type were likewise sold by Shell Chemical Company under the trade name Dobanol. Other examples of suitable ethoxylated alcohols include Tergitol 15-S-7 and Tergitol 15S-9, both of which are linear, secondary alcohol ethoxylates, which are sold by Union Carbide Corporation. Other types of alcohol ethoxylates which can be used in the present composition comprise relatively high molecular weight, nonionic species, such as Neodol 45-11 (Shell Chemical Company). Further alcohol ethoxylates are polyoxyethylene(4) lauryl ether, polyoxyethylene(5) lauryl ether, polyoxyethylene(23) lauryl ether, polyoxyethylene(2) cetyl ether, polyoxyethylene(10) cetyl ether, polyoxyethylene(20) cetyl ether, polyoxyethylene(2) stearyl ether, polyoxyethylene(10) stearyl ether, polyoxyethylene(20) stearyl ether, polyoxyethylene(21) stearyl ether, polyoxyethylene (100) stearyl ether, polyoxyethylene(2) oleyl ether and polyoxyethylene(10) oleyl ether. These are known under trade names, such as ALFONIC®, ARLACEL, BRIJ, GENAPOL®, LUTENSOL, NEODOL®, RENEX, SOFTANOL, SURFONIC®, TERGITOL®, TRYCOL and VOLPO.

Another type of nonionic surfactants comprises the ethylene oxide (EO)-propylene oxide (PO) block polymers. Materials of this type are well known nonionic surfactants which are brought onto the market under the trade name Pluronic. Nonionic EO and PO block polymers of this type have been described in detail by Davidsohn and Milwidsky, Synthetic Detergents, 7th Edition, Langman Scientific and Technical (1987), on pages 34-36 and pages 189-191, and in U.S. Pat. Nos. 2,674,619 and 2,677,700. Another possible type comprises polyhydroxy-fatty acid amide surfactants.

Alcohol ethoxylates of the RENEX series® are preferred.

The component d) used in the formulation according to the invention comprises one or more carrier substances. These are preferably selected from solid carrier substances e) and/or liquid carrier substances f). In the context of the present invention, this means that the liquid carriers are liquid at 40° C. and the solid carriers are solid at 40° C.

In a preferred embodiment of the invention, the polyorganosiloxane composition is characterized in that the liquid carrier substance F) is at least one constituent which is selected from the group consisting of water and water-miscible organic solvents.

In a further preferred embodiment of the invention, the polyorganosiloxane composition contains water.

Preferred liquid carriers f) include aqueous and nonaqueous ones and may include: water alone or organic solvents, preferably water-soluble organic solvents alone and/or mixtures thereof also with water. Preferred organic solvents include: monoalcohols, diols, polyols, such as glycerol, glycol, polyethers, such as polyalkylene glycols, such as polyethylene glycols and mixtures thereof, also with water. Mixtures of solvents are particularly preferred, in particular mixtures of lower aliphatic alcohols, such as ethanol, propanol, butanol or isopropanol and/or diols, such as 1,2-propanediol or 1,3-propanediol; or mixtures thereof with glycerol. Suitable alcohols include in particular $C_1$-$C_4$ alcohols. 1,2-Propanediol and water are preferred.

The liquid carrier f) is expediently present in the formulation according to the invention, based on the total amount of the formulation, in an amount of from 0 to 99.95% by weight, preferably from 0 to 95% by weight, more preferably from 0 to 65% by weight, even more preferably from 0 to 55% by weight. If the liquid carrier f) is present in the formulation according to the invention, its preferred amount is more than 5, more preferably more than 10, most preferably more than 30 to 70, more preferably up to 60, % by weight.

The solid carrier used as component e) is preferably selected from compounds which are solid at 40° C. Examples of solid carriers include water-soluble and water-insoluble solid carriers, such as, for example, inorganic or organic salts, polyhydroxy compounds, saccharides, amides, such as urea, and relatively high molecular weight polyethylene oxides. The solid carriers e) are preferably compounds which have no substantial surface-active effect in the sense of surfactants. Examples of inorganic salts are sodium chloride, potassium chloride, sodium carbonate, sodium sulfate, chalk, magnesium carbonate, kaolin, barium sulfate and zinc oxide. An example of an organic salt is sodium acetate. Examples of polyhydroxy compounds and saccharides which can be used according to the invention are cellulose, starch, cellulose esters, pentaerythritol, sorbitol, glucamine and N-methylglucamine. Amide derivatives which can be used according to the invention are, for example, urea and strongly hydrophilic, saccharide-modified amide derivatives, such as ethylenediamine-bisgluconamide, 1,3-propylenediamine-bisgluconamide, 1,2-propylenediamine-bisgluconamide, diethyltriamine-bisgluconamide, dipropylenetriaminebisgluconamide, N-methyl-dipropylenetriamine-bisgluconamide, N,N-dimethyl-ethylenediamine-gluconamide and N,N-dimethyl-propylenediamine-gluconamide. The last-mentioned saccharide-modified amide derivatives are obtainable by regioselective reaction of the primary amino groups of the corresponding amines with saccharidecarboxylic acid lactones, such as gluconic acid lactone or glucopyranosylarabinonic acid lactone (DE 4 318 536, DE 4 318 537).

The solid carrier e) is expediently contained in the formulation according to the invention, based on the total amount of the formulation, in an amount of from 0 to 99.95% by weight, preferably from 0 to 95% by weight, more preferably from 0 to 65% by weight, even more preferably from 0 to 55% by weight. If the solid carrier e) is contained in the formulation according to the invention, its preferred amount is more than 5, more preferably more than 10, more preferably up to 60, % by weight.

The solid carrier e) and the liquid carrier f) may be present in any desired ratios to one another. The choice of the ratio depends on whether liquid, pasty or solid compositions of the formulation are desired.

The composition according to the invention may contain further other ingredients or auxiliaries c) in addition to the components a1), a2), b) and d) described above, depending on the fields of use.

In the case of aqueous applications, such as in detergents, in pulps, in the case of textile finishing, for example, so-called builders, sterilizing agents, rheology modifiers, such as, for example, zeolites, silicates, silicas having a large surface area, polyphosphates, alkali metal citrates, 2,2-oxydisuccinates, carboxymethyloxysuccinates and nitrilotriacetates, and sodium carbonate, enzymes, antifoams, such as silicone compounds, and stabilizers may be present. Stabilizers serve, for example, for stabilizing the components a) and b) by preventing the coagulation and sedimentation thereof. The stabilizers are, for example, gums and other polysaccharides, such as, for example, carrageen gum, other thickeners or rheology additives. The stabilizer is preferably a crystalline hydroxyl-containing compound, such as trihydroxystearin, a hydrogenated oil or a derivative thereof.

Further auxiliaries which may be contained in the composition according to the invention are typical auxiliaries used in papermaking, such as, for example, wet strength resins, additives for suppressing fluff formation, dry strength additives, fillers and adhesives, binders, smoothing agents, etc.

Further auxiliaries which may be contained in particular in detergents are coupling agents, such as hexylamine, octylamine, nonylamine, their secondary or tertiary C1-C3 analogs and alkanediols.

Further auxiliaries which may be contained in particular in detergents are fragrances, chelating agents and other surface-active substances which adhere to the substrates.

Further auxiliaries are, for example, biocides, such as, for example, Ultrafresh®DM25, DM50, UF40, Amical flowable® or Katon® derivatives.

The invention furthermore relates to a process for the preparation of the polyorganosiloxane compositions according to the invention, which comprises mixing components a1) and a2) and optionally the further components.

The preparation of the composition according to the invention may comprise, for example, the preparation of a homogeneous base mixture a1)+a2) and introduction of the optional components b) and d) with the aid of all known types of mixing units, such as stirrers, mixing nozzles or any form of kneaders or mills.

In an advantageous embodiment of the invention, the components a1) and a2) are first homogeneously mixed to give a premix, optionally with addition of parts of the carrier substance d). In the context of the invention, homogeneous means substantially dissolved or dispersed in finely divided transparent form. For example, the optional component b) can be subsequently introduced into this homogeneous premix. Depending on the structure of the premix components a1) and a2) or the component b), this introduction in turn can lead to a homogeneous mixture or to a visibly coarser disperse distribution b) in the premix a1)+a2). Depending on the intended use, c) and or d) can be introduced into this mixture.

By means of these various mixing strategies, it is possible to influence the microscopic distribution of the components in the overall system and hence the product properties.

The polyorganosiloxane compositions according to the invention are preferably characterized in that they are liquid at 40° C., the presence of a carrier substance not being a precondition for this.

A preferred polyorganosiloxane composition consists of:
from 0.05 to 90% by weight of the components a1) and a2),
from 0 to 30% by weight of one or more silicone-free surfactants b), auxiliaries c), such as
from 0 to 0.5% by weight of one or more biocides,
from 0 to 10% by weight of one or more rheology modifiers,
from 0 to 5% by weight of one or more further auxiliaries and
from 0 to 99.95% by weight of one or more carriers d).

The compositions according to the invention are preferably used for the surface treatment of substrates, in particular fiber substrates or fibrous substrates. They are particularly preferably used for the finishing or treatment of natural or synthetic fibers, hairs, textiles, nonwoven paper fabrics, paper pulps, woven paper fabrics, paper layers, such as dry or moist lavatory papers, facial papers, cleaning tissues, wiping papers and paper handkerchiefs.

In a preferred embodiment, the composition according to the invention serves for the coating of tissue papers, which, in a customary manner, includes felt-pressed tissue paper, high-bulk pattern-densified tissue paper and high-bulk, uncompacted tissue paper, but is not limited thereto. The tissue paper may have a homogeneous or multilayer structure; and tissue paper products produced therefrom may have a single-ply or multiply structure. The tissue paper preferably has a basis weight of from about 10 g/m$^2$ to about 65 g/m$^2$ and a density of about 0.6 g/cm$^3$ or less (cf. column 13, lines 61-67, of U.S. Pat. No. 5,059,282 (Ampulski et al.), which describes how the density of tissue paper is measured. (Unless stated otherwise, all amounts and weights with regard to the paper relate to a dry basis.) A tissue paper pressed in the customary manner and processes for the production of such a paper are generally known among those skilled in the art. Such a paper is as a rule produced by placing a paper furnish on a porous forming wire, which is often referred to among those skilled in the art as a Fourdrinier wire. As soon as the furnish has been placed on the forming wire, it is referred to as a web. The web is drained by pressing the web and drying it at elevated temperature. The special processes and the typical equipment for the production of webs according to the process just described are generally known to those skilled in the art in this area. In a typical process, the pulp furnish having a low consistency is provided from a headbox under pressure. The headbox has an opening for delivering a thin application of pulp furnish to the Fourdrinier wire for the formation of a wet web. The web is then as a rule drained to a fiber consistency of between about 7% and about 25% (based on the weight of the total web) by vacuum draining and is further dried by pressure processes in which the web is subjected to a pressure which is developed by mechanical components located opposite one another, for example cylindrical rolls. The drained web is then further pressed and dried in a steam drum apparatus which is known among those skilled in the art as a yankee drier. Further details are familiar to the person skilled in the art in the area of papermaking.

The paper fibers intended for use in the present invention would usually include fibers originating from chemical wood pulp. Other cellulose-based pulp fibers, such as, for example, cotton linters, bagasse, etc. can also be used. Synthetic fibers, such as, for example, rayon, polyethylene and polypropylene fibers, may also be used in combination with natural cellulose-based fibers. An exemplary polyethylene fiber which may be used is Pulpex® , available from Hercules, Inc. (Wilmington, Del.). Chemical wood pulps which may be used include: chemical pulps, such as, for example, kraft, sulfite and sulfate pulps, and mechanical pulps, which comprise, for example, groundwood, thermomechanical pulp and chemically modified thermomechanical pulp. Chemical pulps are, however, preferred since they impart an excellent palpable softness to tissue sheets produced therefrom. It is possible to use pulps both from deciduous trees (also referred to as "hardwood") and from conifers (also referred to as "softwood"). In the present invention, fibers which originate from recycled paper which may contain some or all of the above-mentioned categories as well as other nonfibrous materials, such as, for example, fillers and adhesives, which are used for facilitating the original papermaking may also be used. In addition to paper fibers, the paper furnish which is used for producing the tissue paper structures may also contain other constituents or materials which have been added thereto, as are known to those skilled in the art. The types of desirable additives are dependent on the special intended end use of the tissue sheet considered. For example, high wet strength is a desirable feature in the case of products, such as, for example, lavatory paper, paper tissues, cosmetic tissues and other similar products. It is therefore often desirable to add to the paper furnish chemical substances which are known to a person skilled in the art as "wet strength" resins, which are known in the prior art. In addition to wet strength additives, it may also be desirable to add to the paper fibers certain dry strength additives and additives for controlling fluff formation, which are known to those skilled in the art.

The polyorganosiloxane compositions according to the invention are furthermore preferably used as softeners or antistatic agents for natural or synthetic fibers or papers, such as hairs, cotton or synthetic fabrics.

The polyorganosiloxane compositions according to the invention are applied to fiber substrates or fibrous substrates preferably in an amount of from 0.01% by weight to 10% by weight, more preferably from 0.2 to 2% by weight, of the nonvolatile constituents of the composition according to the invention, based on the weight of the untreated substrate. The amount applied is determined by determining the weight of the dry untreated substrate. Thereafter, the composition according to the invention is applied and the moist treated substrate is dried at 80° C. for 5 minutes in a forced-circulation oven. The drying time was checked by means of the papers treated only with water and was found to be sufficient. The dried, treated substrate (product) is weighed. The nonvolatile constituents of the composition are accordingly those fractions of the formulation according to the invention which cannot be evaporated in the course of 5 min at 80° C. The components a) and b) form a substantial fraction of preferably more than 90% by weight of the nonvolatile constituents.

The amount of nonvolatile constituents applied is calculated as follows:

The difference between the weight of the untreated, dry substrate and the weight of the dried, treated substrate is the absolute amount applied. The percentage amount applied is the absolute amount applied divided by the weight of the untreated paper multiplied by 100.

The polyorganosiloxane compositions according to the invention may furthermore be used as cleaning agents, wetting agents, corrosion inhibitors, primers, adhesion promoters, antifogging agents or antistatic agents for hard surfaces, and in detergents or as ironing aids.

The present invention furthermore relates to products which contain at least one polyorganosiloxane composition according to the invention.

These are preferably paper products treated with the polyorganosiloxane composition according to the invention. As already explained above, preferably from 0.03% by weight to 30% by weight, preferably from 0.3% by weight to 10% by weight, of the nonvolatile constituents of the composition according to the invention are present in these products.

The proportion of the silicone-containing components a1) and a2) on the fibers is calculated on the one hand from the weight ratio of the formulation a) to d) used, taking into account the vaporizability, and on the other hand by extraction with organic solvents, but more preferably by X-ray fluorescence determination of the silicon content and calculation of the proportion of a1) or a2) by appropriately specifying the proportion of silicon in the underlying structures for a1) or a2). The X-ray fluorescence determination can be carried out as in US 2002-0127412 A1, section [0057], in which a disk of the substrate having a defined geometry is transilluminated after prior calibration.

The compositions according to the invention can be added to the paper pulp or applied to the moist paper or to the prepared paper webs. Thus, the compositions according to the invention can be applied to the substrates, such as, in particular, paper, in a manner known per se, such as by spraying on, immersion, introduction into the paper pulps, by calendering or transfer printing, as described, for example, in U.S. Pat. No. 5,538,595.

It was surprisingly found that, in paper finishing and textile finishing, the hydrophobic character of the finished substrate is considerably reduced and at the same time a superior soft handle is imparted. Furthermore, it was surprisingly found that, by means of the compositions according to the invention, a superior softness in combination with increased hydrophilic character in the fiber finish is achieved even in the presence of relatively large proportions of a2). There is therefore surprisingly a further range of the usable mixing ratio between the components a1) and a2) of a proportion of up to 90% by weight of a2), preferably up to 70% by weight, in which increased hydrophilic character is maintained with constant or increased softness (in the context of the invention, hydrophilic character or hydrophobic character means the evaluation by the drop absorption time method, and softness means the so-called handle, evaluated by a test group (as described in the example section)). Surprisingly, there are narrowly defined mixing ratios in which particularly preferred properties are encountered. A particularly preferred range is therefore a mixing ratio of 50% by weight of a1) and 50% by weight of a2).

The desired properties of the compositions according to the invention can be optimized for a given substrate, with regard to softness (handle), hydrophilic character and substantivity, in particular by optimizing type and molar proportions of hydrophilic, quaternary groups and organopolysiloxane blocks of component a1) and/or a2) and by optimizing the mixing ratio for a given structure of components a1) and a2). For cost reasons, it is preferable to adjust the proportion of component a1) to be as low as possible.

EXAMPLES

Aqueous and solvent-containing compositions according to the invention are described in the following examples.

The evaluation of the compositions according to the invention was effected by means of the following test methods.

Paper and Textile Evaluation:

The silicone compositions according to the invention were evaluated in the form of emulsions using untreated, silicone-free facial tissues from Metsa Tissue Corp. Finland. The papers had dimensions of 29 cm×20.5 cm and a mean paper weight of 31.96 g/m$^2$. For application of the emulsion (finish), a further piece of this paper type was placed behind the paper and the two were clamped in smooth form on a coarse-mesh metal net.

The formulations according to examples 8 to 20 were diluted with demineralized water to a content of 2% by weight of silicone-containing active substance (calculated on the basis of the amount of the sum of the components a1), a2) or a1)+a2) or generally the sum X1 to X3) of tab. 2, including the comparative examples) and applied uniformly by means of a spray gun. The finishing was effected by spraying of the emulsion/solution of the composition according to the invention which was to be tested) from a distance of 35 cm with the aid of a nozzle and air at a constant nozzle setting up to 1% by weight of a calculated amount of the silicone-containing substances from examples 1 to 7 and mixtures thereof (i.e. the sum of X1 to X3 of tab. 2) are present as a coat. These amounts were calculated from the proportion of the nonvolatile constituents a) to d). For this purpose, the amount of the nonvolatile constituents, as defined above, was applied to the paper and determined as below. The concentration of the emulsion sprayed on and the nozzle setting was optimized by means of measurement series so that the quantitatively desired application of the nonvolatile constituents according to the invention was effected with high reproducibility in a spraying time of about 15 seconds without the paper or textile fabric being completely wet through.

The following FIG. 1 shows the relationship between spraying time and applied amount of the arrangement used. Table 1 shows the corresponding underlying measured values.

TABLE 1

| Nozzle distance<br>Spraying time/sec | 30 cm | 35 cm | 40 cm |
|---|---|---|---|
| | | Applied amount | |
| 10 | 0.72% | 0.62% | 0.49% |
| 15 | 1.19% | 0.96% | 0.68% |
| Spraying time for<br>1% application | 13.67 | 15.00 | 21.75 |

For the finishing, the papers were each dried for 5 minutes at 80° C. in a forced-circulation oven with extraction and were weighed immediately after removal from the oven (the mass was calculated by averaging 4 individual weighings). The difference between the weight of the untreated paper and the weight of the dried, treated paper initially gives the absolute applied amount of the nonvolatile constituents. The percentage applied amount is the absolute applied amount divided by the weight of the untreated paper multiplied by 100.

The spraying time was chosen so that 1% by weight as a sum of the silicone compounds X1 to X3, calculated from the nonvolatile constituents, as explained above, was present in the form of a coat.

Six single-ply paper tissues were finished in each case with a composition per test. Of these, 5 tissues were used for evaluating handle and softness and one was used for evaluating the hydrophilic character/hydrophobic character. For the palpation or handle test, the paper samples were folded once so that a double-ply paper was obtained.

Textile Fabric

For testing textile fabrics, the silicone compositions according to the invention were evaluated in the form of emulsions using untreated, silicone-free, boiled cotton single jersey cloths (ready-colored (130 g/m$^2$) from Göla Werke. 30 g of fabric were finished in a liquor comprising 0.4% by weight of silicone-containing components (based on the amount of components a1) and a2) in the formulation) by means of the pad process (Lexikon für Textilveredelung [Lexicon of Textile Finishing], Prof. Dr. rer. nat. Hans-Karl Rouette, Laumann-Verlag Dülmen 1995, Volume 1, pages 699-701). For finishing, the compound a1) of preparation example 2 and a2) of preparation example 5 and a 1:1 mixture of emulsions of the two materials were used. Softness evaluation and consideration of the hydrophilic character were effected analogously to the paper tests.

Hydrophobic Character or Hydrophilic Character:

One paper each, as described above in the section "Paper and textile evaluation", was stretched tautly as a single ply over a metal tray by means of magnets. A water drop was introduced onto the paper from a height of 1 cm by means of a pipette, and the period (in seconds) from contact to absorption of the drop was determined. The longer the drop absorption time, the greater is the hydrophobic character and the less the hydrophilic character. The test was repeated 5 times per sheet of test paper, at different points. The mean value of the 5 individual determinations is stated in tab. 2 (test description: working group on "Textile pretreatment" of the association TEGEWA e.V.: The TEGEWA-Tropftest-eine Methode zur schnellen Bestimmung der Saugfähigkeit an textilen Flächengebilen [The TEGEWA drop test—a method for rapid determination of the absorptivity on textile sheet-like structures]; Melliand Textilberichte 68 (1987), 581-583).

Softness or Handle:

For this purpose, in each case one of the paper samples, obtained as described above, within a test group was compared with in each case 5 other paper samples which had been finished with further silicone compositions of other examples. In this way, 5 test groups/series each comprising 6 different samples could be evaluated in each case by a test person by feeling with fingers and palm with regard to the handle. The classification of the individual papers was effected on a scale from 0 to 10. An evaluation of "0" corresponds to the untreated paper; the higher the number, the better is the handle or the softness.

The test group or the test panel consists of 5 persons.

Preparation Example 1

Preparation of a Component a1) QP1 a) 238 g (2.24 mol) of diethylene glycol are initially introduced under nitrogen at room temperature. 558 g (4.93 mol) of chloroacetyl chloride are added dropwise with thorough stirring in the course of one hour. During the dropwise addition, the temperature increases to 82° C. and intensive evolution of HCl begins. After the end of the dropwise addition, the batch is heated to 130° C. for 30 minutes. Finally, all constituents boiling up to 130° C./20 hPa are distilled off. 566 g of a pale yellow oil of the composition

ClCH$_2$C(O)OCH$_2$CH$_2$OCH$_2$CH$_2$OC(O)CH$_2$Cl are obtained.

The purity of the ester, determined by gas chromatography, is 99.2%.

$^{13}$C-NMR:

| Substructure | shift (ppm) |
|---|---|
| ClCH$_2$— | 40.7 |
| ClCH$_2$—C(O)— | 167.1 |
| ClCH$_2$—C(O)—OCH$_2$— | 65.2 |
| ClCH$_2$—C(O)—OCH$_2$CH$_2$— | 68.6 | b) 104.4 g of demineralized water, 51.4 g of 2-propanol, 104.4 g (522 mmol) of lauric acid and 50 g (580 mmol N) of N,N,N',N'-tetramethylhexanediamine are mixed and are heated to 50° C. with stirring. A mixture of 721 g (522 mmol of epoxy groups) of an epoxysiloxane of the structure

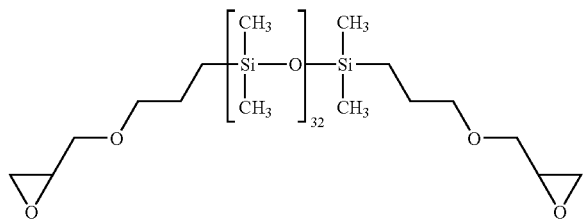

and 7.5 g (58 mmol of Cl) of the diethylene glycol-based ester according to a) is added to the clear solution. The batch is heated to a reflux temperature for 6 hours. After cooling, 1003 g of a clear amber-colored solution are obtained. The polymer present therein contains the following structural elements:

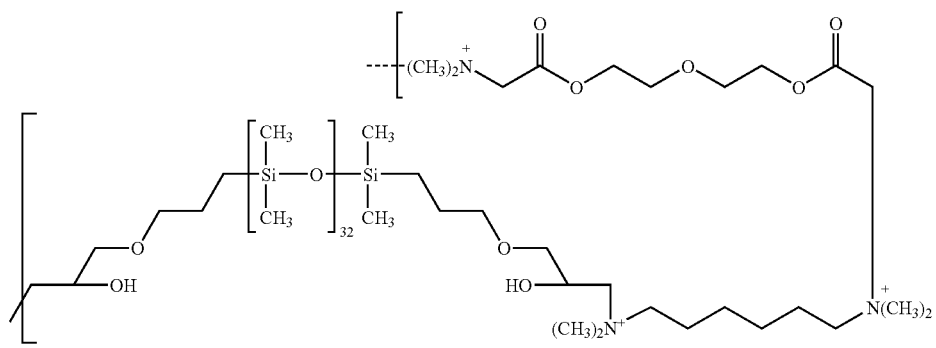

-continued

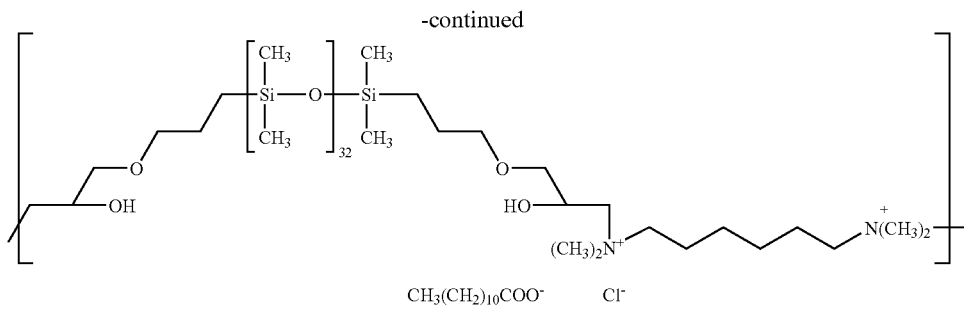

Preparation Example 2

Preparation of Components a1) QP 2

24 g of water, 30 ml of 2-propanol, 4.18 g (48 mmol of tertiary amino groups) of N,N,N',N'-tetramethyl-1,6-hexanediamine and 3.8 g (12 mmol of primary amino groups) of an alkylene oxide derivative of the structure H$_2$NCH(CH$_3$)CH$_2$[OCH$_2$CH(CH$_3$)]a(OCH$_2$CH$_2$)$_9$[OCH$_2$CH(CH$_3$)]$_b$NH$_2$ where a+b=3.6 available under the trade name Jeffamin® ED 600 are initially introduced into a 1 liter three-necked flask at room temperature. 6.0 g (30 mmol) of dodecanoic acid in the form of a 50% strength solution in 2-propanol and 1.8 g (30 mmol) of acetic acid are added in the course of 5 minutes. After the batch has been heated to 50° C., 194.1 g (60 mmol of epoxy groups) of an epoxysiloxane of the average composition

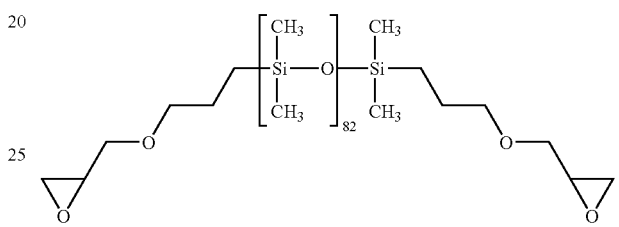

are added dropwise in the course of 30 minutes. The yellow, turbid mixture is heated to the reflux temperature for 8 hours. After removal of all constituents volatile in vacuo up to 100° C./2 mm Hg, 204 g of a beige, turbid material which has the following structure are obtained.

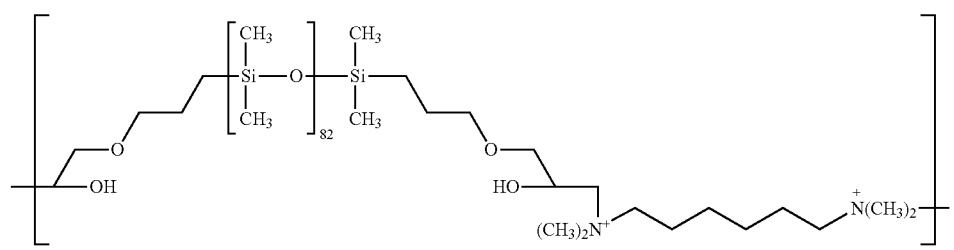

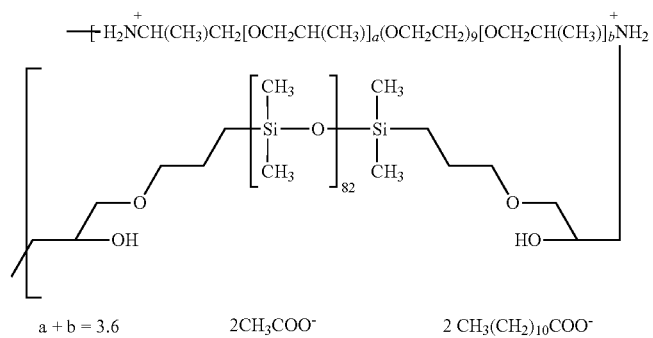

Preparation Example 3

Preparation of Component a1) QP 3

12.5 g of demineralized water, 87 g of 2-propanol, 1.02 g (17 mmol) of acetic acid, 3.4 g (17 mmol) of lauric acid, 2.34 g (27.2 mmol N) of N,N,N',N'-tetramethylhexanediamine, 1.67 g (5.28 mmol N) of an amine of the composition

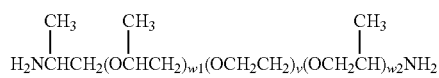

where w1+w2=2.5 and v=8.5 and 0.63 g (1.53 mmol N) of a 40% strength solution of an amine of the composition

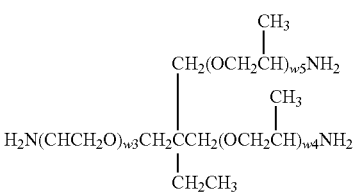

where w3+w4+w5=5-6 are mixed and are heated to 50° C. 90.8 g (34 mmol of epoxy groups) of an epoxysiloxane of the average composition

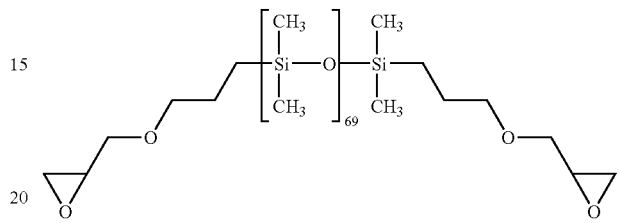

are added dropwise in the clear solution, and the reaction mixture is heated to 82° C. for 10 hours. After cooling, 197 g of a turbid, gray liquid are obtained. The polymer present therein contains the following structural elements

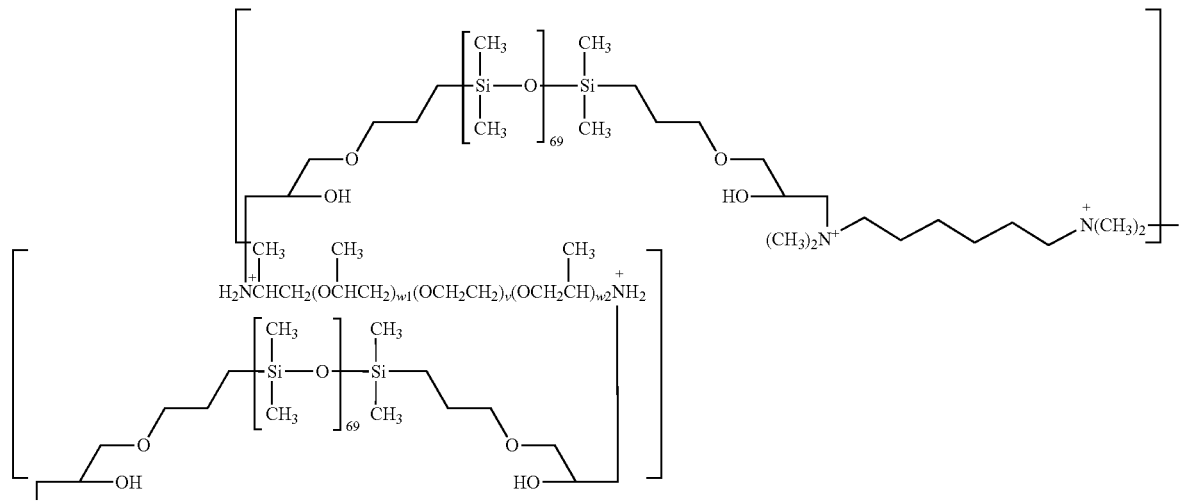

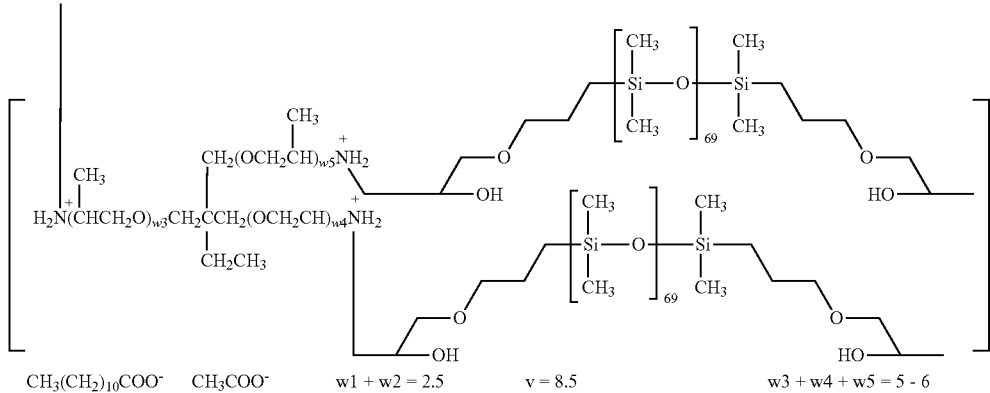

CH$_3$(CH$_2$)$_{10}$COO$^-$   CH$_3$COO$^-$   w1 + w2 = 2.5   v = 8.5   w3 + w4 + w5 = 5 - 6

Preparation Example 4

Preparation of Component a2) AP 1

An aminoethylaminopropyl-functional polyorganosiloxane of the type $MD^{AEAP}_9\text{-}D_{557}M$—the unit $D^{AEAP}$ denotes $CH_3(AEAP)SiO$ with AEAP=2-aminoethylaminopropyl—is prepared analogously to U.S. Pat. No. 3,576,779, by equilibrating a mixture of SiOH-terminated polydimethylsiloxane, M2D10 and the aminoethylaminopropyl-methyldimethoxysilane in the presence of tetrabutylammonium hydroxide at 80° C., evaporating the methanol formed and, after thermal deactivation of the catalyst, removing vaporizable cyclosiloxanes having b.p. up to 250° C. to below 0.5% by weight. The product formed has the following composition:

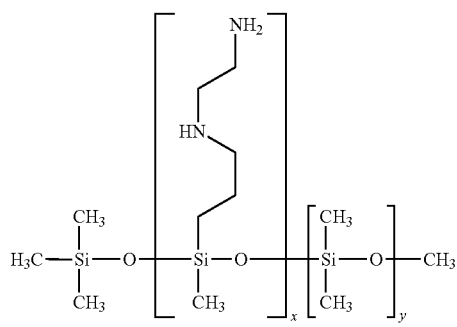

AP 1: x = ~9.2; y = ~557

Preparation Example 5

Preparation of Component a2) AP 2

The aminoethylaminopropyl-functional polyorganosiloxane of the type $MD^{AEAP}_{1.5}\text{-}D_{100}M$ used here for the comparative experiments for evaluating the hydrophilizing handle improvers or softeners according to the invention on textile fabrics was prepared analogously to example 4 (x=1.5; y=100).

Preparation Example 6

Preparation of the Comparative Siloxane Component AP 3

The polyether-functional polyorganosiloxane $MD^{PO15EO20}_3D_{20}M$ used here for the comparative experiments for evaluating the hydrophilizing handle improvers or softeners according to the invention for paper was prepared analogously to example 7 in U.S. Pat. No. 3,980,688. The unit $D^{PO15EO20}$ denotes $CH_3(PO_{15}EO_{20})SiO$ with $PO_{15}EO_{20}$, a randomly distributed polyether radical $HO\text{—}C_3H_7O)_{15}(C_2H_5O)_{20}\text{—}C_3H_6\text{—}$, which is bonded to Si via the propylene unit. The numbers indicate the mean degree of polymerization from the number average molecular weight $M_n$.

Preparation Example 7

Preparation of a Component a2) AP 4

The aminoethylaminopropyl- and polyether functional polyorganosiloxane $MD^{AEAP}_4D^{PO16EO20OBu}_4D_{200}M$ used here was prepared by alkaline equilibration (20 ppm of tetrabutylammonium hydroxide) starting from a polyethersiloxane of the type $MD^{PO16EO20OBu}_4D_{100}M$ with aminoethylaminopropylmethyldiethoxysilane and additional polydimethylsiloxanediol in the presence of tetrabutylammonium hydroxide at 80° C., the methanol formed was evaporated and, after thermal deactivation of the catalyst, vaporizable cyclosiloxanes having a b.p. up to 250° C. were removed to below 0.5% by weight.

The unit $D^{PO16EO20OBu}$ denotes $CH_3(PO_{16}EO_{20}OBu)SiO$ with $PO_{16}EO_{20}OBu$, a randomly distributed polyether radical $C_4H_9\text{—}O\text{—}(C_3H_7O)_{16}(C_2H_5O)_{20}\text{—}C_3H_6\text{—}$, which is bonded to Si via the propylene unit. The numbers indicate the mean degree of polymerization from the number average molecular weight $M_n$.

Formulation Examples 8-23

Using the compounds of preparation examples 1 to 7, emulsions having a composition: 40% by weight of the compounds or the mixtures thereof as component a) or comparative component, 23.7% by weight of Renex 36 as component b), 4.1% by weight of Renex 30, likewise as component b), are prepared by mixing with an anchor stirrer at 25° C. A solution consisting of 0.9% by weight of acetic acid and 0.695% by weight of sodium acetate in 30.61% by weight of water is added to this mixture over 5 min. Clear, colorless to slightly yellowish formulations form. In the case of surfactants of component b) which are used here, nonionic surfactants of the type Renex 30, international short form POE (12)-tridecyl alcohol, and Renex 36 from ICI of the type POE (6)-tridecyl alcohol were chosen.

Exact compositions of the formulations are shown in table 2 below. Table 2 also shows the results of the paper and textile evaluations of the paper tissues, which, as described above, were finished with 1% by weight of compositions (based on the nonvolatile constituents, as defined above) and were conditioned.

TABLE 2

Evaluation of handle and hydrophobic character of the test papers and test textiles

| Examples | | Appearance | Components Preparation examples | | | Formulation ratio Relative amounts | | | Handle )* | Hydrophobic character )[2] [sec] |
|---|---|---|---|---|---|---|---|---|---|---|
| | | | X1 | X2 | X3 | X1 | X2 | X3 | | |
| Paper | | | | | | | | | | |
| 8 | Comparison | clear colorless to yellowish | 1 | — | — | 100 | — | — | 5 | 0.6 |
| 9 | acc. to the invention | clear colorless to yellowish | 1 | 4 | — | 75 | 25 | — | 4.4 | 2.0 |

TABLE 2-continued

Evaluation of handle and hydrophobic character of the test papers and test textiles

| | | | Components Preparation examples | | | Formulation ratio Relative amounts | | | | Hydrophobic character )[2] |
|---|---|---|---|---|---|---|---|---|---|---|
| | Examples | Appearance | X1 | X2 | X3 | X1 | X2 | X3 | Handle )* | [sec] |
| 10 | acc. to the invention | clear colorless to yellowish | 1 | 4 | — | 50 | 50 | — | 8.3 | 5.8 |
| 11 | acc. to the invention | clear colorless to yellowish | 1 | 4 | — | 30 | 70 | — | 4.7 | 3.2 |
| 12 | acc. to the invention | clear colorless to yellowish | 1 | 4 | — | 10 | 90 | — | 9.8 | 21.8 |
| 13 | Comparison | clear colorless to yellowish | — | 4 | — | 0 | 100 | — | 4.1 | 10.4 |
| 14 | acc. to the invention | clear colorless to yellowish | 2 | 4 | — | 50 | 50 | — | 10 | 2.7 |
| 15 | Comparison | clear colorless to yellowish | 2 | — | — | 100 | 0 | — | 3.6 | 4.3 |
| 16 | Comparison | clear colorless to yellowish | 3 | — | — | 100 | 0 | — | 2.8 | 3.3 |
| 17 | acc. to the invention | clear colorless to yellowish | 3 | 4 | — | 50 | 50 | — | 3.6 | 4.8 |
| 18 | Comparison | clear colorless to yellowish | — | 4 | 6 | — | 50 | 50 | 2.5 | 2.5 |
| 19 | Comparison | clear colorless to yellowish | — | 7 | — | — | 100 | — | 3.5 | 3.6 |
| | Textile | | | | | | | | | |
| 21 | acc. to the invention | clear colorless to yellowish | 2 | 2 | — | 50 | 50 | | 9.2 | 3.0 |
| 22 | Comparison | clear colorless to yellowish | 2 | — | — | 100 | — | — | 9.2 | 5.0 |
| 23 | Comparison | clear colorless to yellowish | — | 5 | — | — | 100 | — | 9.2 | >30 |

)* Handle: Test group as described above.
Hydrophobic character: Drop absorption time according to TEGEWA drop test - a method for rapid determination of the absorptivity on textile sheet-like structures; Melliand Textilberichte 68 (1987), 581-583.

The experiments show that, in examples 9-11, the compositions according to the invention also have, with given good handle or good softness, similarly good hydrophilic character (short drop absorption time), which is at a level similar to example 8 with 100% of the more expensive component a1) or X1 of table 2. A further increase in the proportion of component a2) or X2 according to examples 11 and 12 in tab. 2 leads to an abrupt increase in the hydrophobic character and the drop absorption time, which may even be above that with 100% of compound a2). Examples 14 and 17 show that the compositions according to the invention are effective even with components a1) of the composition of the preparation examples 2 and 4 if they are mixed 1:1 with example 4 as component a2).

Although the replacement of component a1) by compounds according to the prior art, as in comparative example 18, leads to sufficient hydrophilic character, softness and handle are poorer than in examples 9-12. Furthermore, the substantivity of the polysiloxanes from preparation examples 6 and 4 which are used in example 18 does not reach the level of quaternary siloxanes, such as examples 8-11. As shown by comparative example 19, in which a compound a2) according to preparation example 7, which has a hydrophilic polyether radical in the molecule in addition to an aminoalkyl radical, is evaluated, a poorer evaluation. This compound, too, does not lead to good softness (>4.4), i.e. the evaluation of handle is poorer than that of the examples according to the invention, in particular 9-11 and 14. Furthermore, the substantivity of this compound is lower than, for example, that of the quaternary compounds of examples 8 to 11.

The invention claimed is:

1. A polyorganosiloxane composition containing at least one amino- and/or ammonium-polysiloxane compound a1) containing at least one amino and/or ammonium group Q and at least one organic radical V, wherein the at least one organic radical V is an organic radical $V^{Si1}$ containing a polydiorganosiloxane group, wherein the binding of the group Q to the group $V^{Si1}$ is effected by the structural element (I)

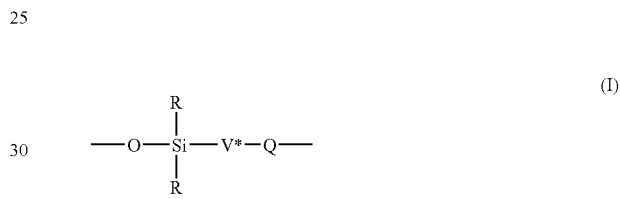

(I)

wherein V* is a divalent organic radical which in each case is bonded via a carbon atom to the silicon atom of the polydiorganosiloxane radical and to the nitrogen atom of the amino or ammonium group Q, and R is a monovalent organic radical, and at least one amino- and/or ammonium-polysiloxane compound (a2) containing at least one amino or ammonium group Q and at least one organic radical V, with the proviso that at least one organic radical V is an organic radical $V^{si2}$ containing a polydiorganosiloxane group, wherein the binding of the group Q to the group $V^{si2}$ is effected by the structural element selected from the formulae (II) and (III)

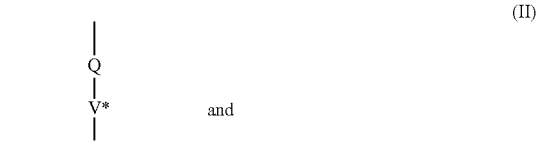

(II)

and

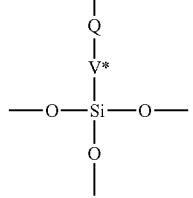

(III)

wherein V* is a divalent organic radical which is bonded via a carbon atom to the silicon atom of the organosiloxane radical and to the nitrogen atom of the amino or ammonium group Q, and R is a monovalent organic radical, wherein said amino- and/or ammonium-polysiloxane compound a2) is selected from linear or branched polysiloxanes which are composed of silyloxy units which are selected from the group consisting of:

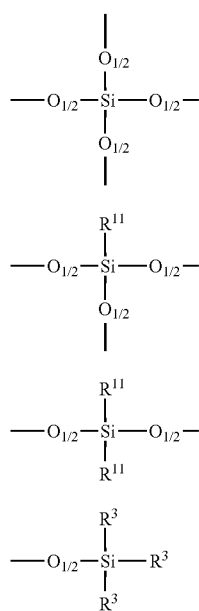

wherein $R^{11}$ is an organic radical and $R^3$ may be identical or different and is selected from the group which consists of $C_1$ to $C_{22}$ alkyl, fluoro($C_3$-$C_{10}$) alkyl, $C_6$-$C_{10}$-aryl, which in each case may be identical or different from one another, with the proviso that at least one of the radicals $R^{11}$ contains at least one nitrogen atom, which nitrogen-containing groups $R^{11}$ are selected from:

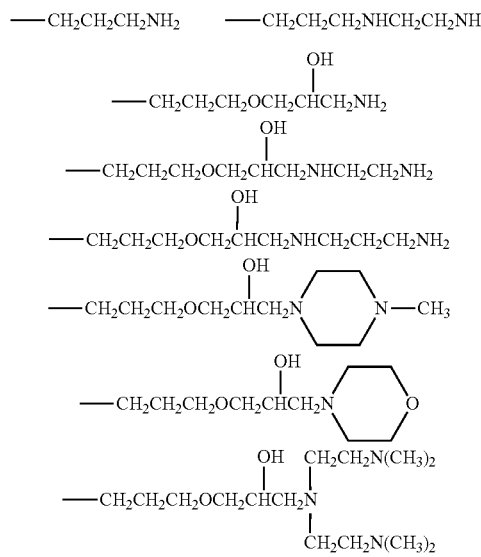

-continued

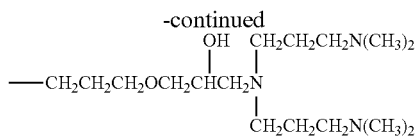

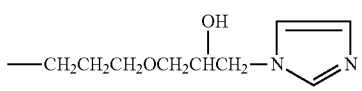

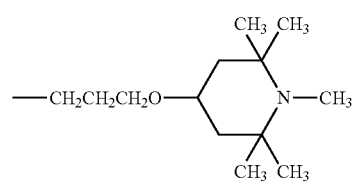

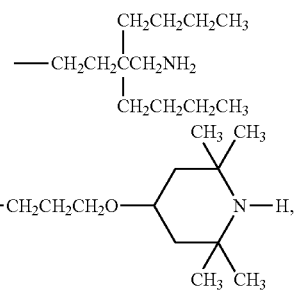

with the proviso that the amino- and/or ammonium-polysiloxane compound (a2) has no structural element of the formula (I), and with the proviso that the group Q does not bond to a carbonyl carbon atom, and wherein the positive charges resulting from ammonium groups are neutralized by organic or inorganic acid anions, and the acid addition salts thereof.

2. The polyorganosiloxane composition of claim 1, wherein the composition contains no nitrogen-free polysiloxane compound.

3. The polyorganosiloxane composition of claim 1, which consists of: component (a1), component (a2), at least one further component selected from the group consisting of silicone-free surfactants (b), auxiliaries (c) and carrier substances (d) and combinations thereof.

4. The polyorganosiloxane composition of claim 1, wherein the components (a1) and (a2) are present in the weight ratio of from 30:1 to 1:90.

5. The polyorganosiloxane composition of claim 1, wherein the components (a1) to (a2) are present in a weight ratio of from 1:0.1 to 1:10.

6. The polyorganosiloxane composition of claim 1, wherein the amino- and/or ammonium-polysiloxane compound (a1) has the formula (IV)

wherein $R^E$ is a monovalent organic radical or hydrogen, x is at least 1, the radicals $R^E$ may be the same or different and, if x is greater than 1, the groups Q and V may be the same or different.

7. The polyorganosiloxane composition of claim 1, wherein Q is selected from the group consisting of:

a saturated or unsaturated, diamino-functional heterocycle which is optionally substituted by further substituents and has a formula selected from the group consisting of:

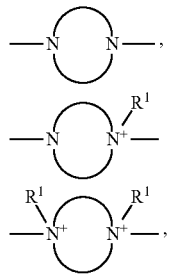

an aromatic, optionally substituted, diamino-functional heterocycle of the formula:

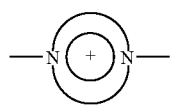

a trivalent radical of the formula:

a trivalent radical of the formula:

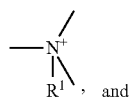

and a tetravalent radical of the formula

wherein $R^1$ is hydrogen or a monovalent organic radical, and wherein Q does not bind to a carbonyl carbon atom.

8. The polyorganosiloxane composition of claim 1, wherein the unit V is selected from at least one polyvalent, straight-chain, cyclic or branched, saturated, unsaturated or aromatic hydrocarbon radical having up to 1000 carbon atoms exclusive of the carbon atoms of the polyorganosiloxane radical which optionally may contain one or more groups selected from
(a) —O—,
(b) —C(O)—,
(c) —C(S)—,
(d) —$NR^2$—, wherein $R^2$ is hydrogen, a monovalent, straight-chain, cyclic or branched, saturated, unsaturated or aromatic hydrocarbon radical having up to 300 carbon atoms which may contain one or more groups selected from —O—, —NH—, —C(O)— and —C(S)—, and which is optionally substituted by one or more substituents selected from the group consisting of a hydroxyl group, an optionally substituted, heterocyclic group where, if a plurality of groups —$NR^2$— is present, these may be identical or different, and wherein the group —NH— binds to a carbonyl and/or thiocarbonyl carbon atom,
(e)

and may contain
(f) polyorganosiloxane radicals,
and which optionally may be substituted by one or more hydroxyl groups, wherein the groups

and —$NR^2$— bind to at least one carbonyl and/or thiocarbonyl carbon atom, and wherein at least one radical V contains at least one polyorganosiloxane radical.

9. The polyorganosiloxane composition of claim 1, wherein the amino- and/or ammonium-polysiloxane compound (a1) has at least three units selected from the units Q and V, wherein Q is at least one di-, tri, and/or tetravalent amino and/or ammonium group which is not bonded to V via a carbonyl carbon atom, and V is at least one organic radical which is linked to the Q units via carbon, with the proviso that at least one of the units V contains a polydiorganosiloxane radical.

10. The polyorganosiloxane composition of claim 1, wherein the amino- and/or ammonium-polysiloxane compound (a1) has at least two units Q.

11. The polyorganosiloxane composition of claim 1, wherein the amino- and/or ammonium-polysiloxane compound (a1) has at least two units Q and further comprises more than one unit $V^{Si}$, wherein $V^{Si}$ is a polyorganosiloxane group.

12. The polyorganosiloxane composition of claim 1, wherein the amino- and/or ammonium-polysiloxane compound (a1) has at least two units Q and further comprises more than two units $V^{Si}$, wherein $V^{Si}$ is a polyorganosiloxane group.

13. The polyorganosiloxane composition of claim 1, wherein the composition is a liquid at 40° C.

14. The polyorganosiloxane composition of claim 1, containing
(I) from 0.05 to 90% by weight of the components (a1) and (a2),
(II) from 0 to 30% by weight of one or more silicone-free surfactants (b),
(III) auxiliaries (c) selected from:
(a) from 0 to 0.5% by weight of one or more biocides,
(b) from 0 to 10% by weight of one or more rheology modifiers, and (c) from 0 to 5% by weight of one or more further auxiliaries and (IV) up to 99.95% by weight of one or more carriers (d).

15. The polyorganosiloxane composition of claim 3, wherein the silicone-free surfactant (b) is at least one constituent which is selected from unpolymerized, organic, quaternary ammonium compounds.

16. The polyorganosiloxane composition of claim 3, wherein the carrier substance (d) is at least one constituent which is selected from the group consisting of water and water-miscible organic solvents.

17. The polyorganosiloxane composition of claim 3, wherein the silicone-free surfactant (b) is selected from non-ionic emulsifiers.

18. The polyorganosiloxane composition of claim 1, which further comprises water.

19. A process for the preparation of the polyorganosiloxane compositions of claim 1 comprising mixing the components (a1) and (a2).

20. A process for treating a substrate comprising applying the composition of claim 1 to the substrate.

21. The process of claim 20 wherein the substrate comprises fibers.

22. The process of claim 21 wherein the substrate is selected from the group consisting of natural fibers, synthetic fibers, hairs, textiles, nonwoven paper fabrics, paper pulps, woven paper fabrics, lavatory papers, facial papers, cleaning cloths, wiping papers and paper handkerchiefs.

23. A process for softening a substrate or reducing static in a substrate comprising applying the polyorganosiloxane compositions of claim 1 to the substrate, wherein the substrate is selected from the group consisting of natural fibers and synthetic fibers.

24. A process of treating a substrate comprising applying 0.03wt % to 30 wt % of the nonvolatile constituents of the polyorganosiloxane composition of claim 1 to the substrate, based on the dry mass of the substrate.

25. A process for treating a substrate comprising applying the composition of claim 1 to a substrate, wherein the composition of claim 1 comprises 0.01 wt % to 10 wt % of components (a1) and (a2).

26. A method of reducing corrosion, fogging or static electricity on a substrate comprising applying the composition of claim 1 to a substrate.

27. An article of manufacture containing the polyorganosiloxane composition of claims 1.

28. The polyorganosiloxane composition of claim 1, wherein the components (a1) and (a2) are present in a weight ratio of from 1:0.2 to 1:7.

29. The polyorganosiloxane composition of claim 1, wherein the components (a1) and (a2) are present in a weight ratio of 1 to 1.

30. The polyorganosiloxane composition of claim 1, wherein the organic radical V in the amino- and/or ammonium-polysiloxane compound (a1) is at least one constituent selected from the group consisting of $V^1$, $V^2$ and $V^3$, wherein
the radical $V^2$ contains at least one group —$Z^2$— of the formula (V)

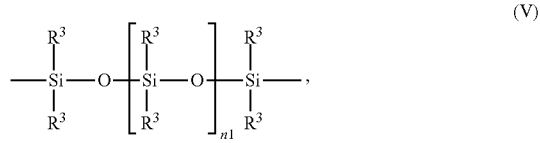

(V)

wherein $V^2$ is selected from divalent, straight-chain, cyclic or branched, saturated, unsaturated or aromatic hydrocarbon radicals having up to 1000 carbon atoms exclusive of the carbon atoms of the polysiloxane radical $Z^2$, which optionally may contain one or more groups selected from (a) —O—, (b) —CONH—, (c) —CONR²—, wherein R² is hydrogen, a monovalent, straight-chain, cyclic or branched, saturated, unsaturated or aromatic hydrocarbon radical having up to 100 carbon atoms which may contain one or more groups selected from (1) —O—, (2) —NH—, (3) —C(O)— and (4) —C(S)—, and which may be optionally substituted by one or more substituents selected from the group consisting of (i) a hydroxyl group, (ii) an optionally substituted heterocyclic group optionally containing one or more nitrogen atoms, (iii) amino, (iv) alkylamino, (v) dialkylamino, (vi) ammonium, (vii) polyether radicals and (viii) polyetherester radicals, where, if a plurality of groups —CONR² is present, these may be identical or different, (d) —C(O)— and (e) —C(S)—, wherein the radical $V^2$ may be optionally substituted by one or more hydroxyl groups, wherein $R^3$ may be identical or different and is selected from the group which consists of $C_1$ to $C_{22}$ alkyl, fluoro($C_3$-$C_{10}$) alkyl, $C_6$-$C_{10}$-aryl and n1 =20 to 1000, wherein $V^1$ is selected from divalent, straight-chain, cyclic or branched, saturated, unsaturated or aromatic hydrocarbon radicals having up to 1000 carbon atoms which optionally may contain one or more groups selected from (A) —O—, (B) —CONH—, (C) —CONR²—, wherein R² is as defined above, it being possible for the groups R² in the groups $V^1$ and $V^2$ to be identical or different, (D) —C(O)—, (E) —C(S)— and (F) —$Z^1$—, wherein —$Z^1$— is a group of the formula

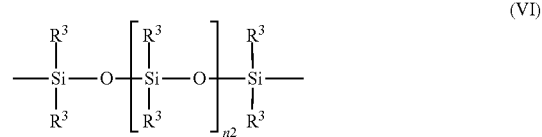

(VI)

wherein the groups $R^3$ in the groups $V^1$ and $V^2$ may be identical or different, and n2 =0 to 19, wherein the radical $V^1$ may be optionally substituted by one or more hydroxyl groups, and wherein $V^3$ is a trivalent or higher-valent, straight-chain, cyclic or branched, saturated, unsaturated or aromatic hydrocarbon radical having up to 1000 carbon atoms which optionally may contain one or more groups selected from —O—, —CONH—, —CONR$^2$—, —C(O)—, —C(S)—, —Z$^1$—, —Z$^2$—, and Z$^3$, wherein Z$^3$ is a trivalent or higher-valent organopolysiloxane unit, and wherein Z$^3$ may be optionally substituted by one or more hydroxyl groups, it being possible in each case for one or more groups V$^1$, one or more groups V$^2$ and/or one or more groups V$^3$ to be present in said polysiloxane compound, with the proviso that said polysiloxane compound contains at least one group V$^1$, V$^2$ or V$^3$ which contains at least one group —Z$^1$—, —Z$^2$— or Z$^3$, respectively.

* * * * *